US007864184B2

(12) United States Patent
Aoki

(10) Patent No.: US 7,864,184 B2
(45) Date of Patent: Jan. 4, 2011

(54) IMAGE PROCESSING DEVICE, IMAGE PROCESSING SYSTEM, IMAGE PROCESSING METHOD, COMPUTER PROGRAM, AND SEMICONDUCTOR DEVICE

(75) Inventor: Sachiyo Aoki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 961 days.

(21) Appl. No.: 11/631,541

(22) PCT Filed: Jul. 1, 2005

(86) PCT No.: PCT/JP2005/012628

§ 371 (c)(1),
(2), (4) Date: Mar. 6, 2007

(87) PCT Pub. No.: WO2006/006510

PCT Pub. Date: Jan. 19, 2006

(65) Prior Publication Data

US 2007/0296728 A1 Dec. 27, 2007

(30) Foreign Application Priority Data

Jul. 9, 2004 (JP) ............................ 2004-203258

(51) Int. Cl.
*G06F 13/00* (2006.01)

(52) U.S. Cl. ........................ 345/537; 345/536; 345/531

(58) Field of Classification Search ......... 345/541-544, 345/538, 537, 531, 540
See application file for complete search history.

(56) References Cited

U.S. PATENT DOCUMENTS

| | | | | |
|---|---|---|---|---|
| 4,862,269 | A * | 8/1989 | Sonoda et al. | 348/514 |
| 5,710,604 | A | 1/1998 | Hodson | |
| 5,767,866 | A | 6/1998 | Chee et al. | |
| 5,963,192 | A * | 10/1999 | Wong et al. | 345/593 |
| 2002/0071060 | A1 | 6/2002 | Hashemi | |
| 2004/0070687 | A1 | 4/2004 | Voltz et al. | |

FOREIGN PATENT DOCUMENTS

| | | | |
|---|---|---|---|
| EP | 0304236 | A | 2/1989 |
| JP | 06-311491 | A | 11/1994 |
| JP | 09-281939 | A | 10/1997 |
| JP | 11-511263 | | 9/1999 |
| JP | 2004-318007 | A | 11/2004 |

OTHER PUBLICATIONS

IRS & Written Opinion Aug. 23, 2005.
European Search Report for International Application PCT/JP2005012628.

* cited by examiner

*Primary Examiner*—Xiao M Wu
*Assistant Examiner*—Scott E Sonners
(74) *Attorney, Agent, or Firm*—Matthew B. Dernier, Esq.; Gibson & Dernier LLP

(57) ABSTRACT

Provided is an image processing device for outputting a graphic image drawn into a frame memory after saving the image in a display memory. The image processing device is provided with a save processing section for saving frame data representing a predetermined image from a graphic memory in which the frame data is stored to a display memory, and an output interface for outputting the frame data saved in the display memory by transforming the frame data into a video output signal. The save processing section saves the frame data from the graphic memory to the display memory in equally divided units (partial data units). The partial data units of the frame data are outputted from the display memory.

12 Claims, 15 Drawing Sheets

IMAGE PROCESSING DEVICE, IMAGE PROCESSING SYSTEM, IMAGE PROCESSING METHOD, COMPUTER PROGRAM, AND SEMICONDUCTOR DEVICE

TECHNICAL FIELD

The present invention relates to an image processing device whose latency is improved without increasing a storage capacity of a memory used for image processing as much as possible, and to an image processing method executed by the image processing device, an image processing system, and a computer program.

BACKGROUND OF THE INVENTION

In a field of image processing, there is a case where an graphic image drawn in a frame memory is temporarily saved to a display memory and is outputted to a display unit or the like from the display memory by transforming the graphic image into a video output signal conforming to a standard such as an NTSC system. Saving the graphic image from the frame memory allows an image of a next frame to be drawn in the frame memory even when the video output signal is being outputted.

Saving of the graphic image from the frame memory to the display memory is carried out after a display of a previous frame is finished. Saving from the frame memory to the display memory is carried out during VBI (Vertical Blank Interval). There is also a case where the transformation process is carried out on the graphic image that has been saved to the display memory. In this case, the conversion process must also be carried out during the VBI as well as the saving. Because saving and transformation processes that can be carried out during the VBI are limited, a size and definition of a displayable image may be determined by such the limitation. Still more, drawing to the frame memory can only be carried out after finishing the save. Therefore, drawing to the frame memory cannot be carried out asynchronously with the output.

As one measure for solving these problems, the display memory has a double-buffer structure. By using the display memory with the double-buffer structure, it becomes possible to carry out the processes such as saving of a graphic to another display memory and transformation thereof while displaying an image from one display memory on a display unit, so it becomes unnecessary to finish the saving and transformation processes during the VBI. Still more, drawing and output may be carried out asynchronously because drawing to the frame memory can be carried out immediately after finishing the saving.

However, it is not economical to provide the display memory with the double-buffer structure because storage capacity of the display memory will need at least twice the capacity as the frame buffer. Still more, there arises a problem in that latency increases.

SUMMARY OF THE INVENTION

Accordingly, an object of the present invention is to solve the above-mentioned problems and to provide an image processing technique which shortens latency more than the conventional method employing the double-buffer structure, enables the saving and transformation processes to be carried out outside the VBI interval, and enables drawing and output to be carried out asynchronously while suppressing an increase amount of the display memory to the minimum.

An image processing device of the present invention made to solve the above-mentioned problems includes: image processing means for carrying out predetermined image processing per frame of a moving image, and storing frame data representing an image corresponding to a result of the image processing to a predetermined graphic memory; save processing means for saving the frame data stored in the graphic memory to a predetermined display memory, where the frame data is stored in equally divided units (e.g., partial data units); and an output interface for transforming the partial data units of the frame data into a video output signal and outputting the video output signal to the outside.

The frame data is saved in the display memory as partial data divided into a plurality of parts. The frame data is outputted from the display memory not at once but in a unit of partial data. The use of the partial data enables the data to be outputted before the entire frame data is saved, so the latency becomes shorter than in the conventional case of employing the double-buffer structure for the display memory.

The partial data needs to be at least saved before reaching the timing when the partial data is outputted from the display memory. For example, at least partial data outputted right after a VBI interval needs to be saved, so the process for saving the frame data may be carried out even outside the VBI interval. Still more, when a transformation process is carried out on the saved partial data, the saving and transformation processes of other partial data need to at least end before reaching the actual output timing even when exceeding the VBI interval if the saving and transformation processes of the partial data outputted right after the VBI interval have been carried out. Still more, the use of the display memory allows the drawing and output to be carried out asynchronously because drawing to the graphic memory becomes possible if the frame data is saved from the graphic memory to the display memory.

When the display memory has a plurality of buffer areas, for example, the save processing means is arranged so as to store pieces of partial data, which are obtained by equally dividing the frame data stored in the graphic memory into a number equal to or less than the number of buffer areas of the display memory and into a data size that can be stored in each of the buffer areas, to the buffer areas whose number corresponds to the number of the pieces of partial data.

The buffer area may be a storage area logically formed in the memory unit or a storage area formed physically by a plurality of memory units. The buffer area may also be formed logically and physically by the plurality of memory units.

For example, the display memory is provided with the buffer area in a number capable of storing frame data of at least one frame and less than two frames. Such configuration allows the storage capacity of the memory used for the display memory to be reduced more than the case of employing the double-buffer structure for the display memory.

In addition, the save processing means is arranged, for example, to be able to confirm states of saving of the partial data from the graphic memory to the display memory and states of output of the partial data stored in the display memory, and to save the partial data from the graphic memory to the display memory in accordance with the output state of the partial data from the display memory.

Such the image processing device can be arranged so as to carry out the following saving and transformation processes.

For example, in a case where the display memory is provided with "n", which is an integer of "2" or more, buffer areas, and the pieces of partial data of the frame data equally divided into "n" parts by the save processing means are respectively stored in each of the buffer areas, when "m", which is an integer represented by "1≦m≦(n−1)", pieces of partial data are outputted from the display memory, the save processing means is arranged such that the "m" pieces of partial data among frame data of a next frame stored in the graphic memory equally divided into "n" parts are saved to the buffer areas of the display memory from which the pieces of partial data have been outputted, and when remaining pieces of partial data of the same frame data as the partial data previously outputted from the display buffer are outputted in succession, the remaining pieces of partial data from the graphic memory are saved to the buffer areas of the display memory.

In addition, when the display memory is provided with "(n+1)", where "n" is an integer of "2" or more, buffer areas, and the pieces of partial data of the frame data equally divided into "n" parts by the save processing means are stored in the "n" buffer areas, the save processing means is arranged so as to save the frame data stored in the graphic memory to the display memory by equally dividing the frame data into "n" pieces of partial data when the partial data of "(n−1)" pieces are outputted from the display memory.

In these cases, an image processing device may further include image transformation processing means for carrying out a predetermined transformation process on the pieces of partial data saved in the buffer areas of the display memory, and for storing results of the transformation process in the buffer areas in which the pieces of partial data have been stored.

Further, for example, in a case where an image processing device is made to further include image transformation processing means for carrying out a predetermined transformation process on the partial data saved in the display memory, the display memory is provided with "(n+2)", where "n" is an integer of "2" or more, buffer areas, and pieces of partial data of the frame data equally divided into "n" parts by the save processing means are stored in the "n" buffer areas, when "m", where "m" is an integer represented by "1≦m≦(n−1)", pieces of partial data is outputted from the display memory, the save processing means may be arranged such that the "m" pieces of partial data among next frame data equally divided into "n" parts from the graphic memory are saved to the display memory, and when remaining pieces of partial data of the same frame data as the partial data previously outputted from the display buffer are outputted in succession, the remaining pieces of partial data from the graphic memory are saved to the buffer areas of the display memory. Further, the image transformation processing means may be arranged so as to carry out the predetermined transformation process on the pieces of partial data saved in the buffer areas, and to store results of the transformation process in the buffer areas except the buffer areas in which the partial data has been saved and in which the pieces of partial data divided from the same frame data as the partial data have been saved.

Further, for example, in a case where an image processing device further includes image transformation processing means for carrying out a predetermined transformation process on the partial data saved in the display memory, the display memory is provided with "(n+3)", where "n" is an integer of "2" or more, buffer areas, and pieces of partial data of the frame data equally divided into "n" parts by the save processing means are stored in the "n" buffer areas, when "m", which is an integer represented by "1≦m≦(n−1)", pieces of partial data are outputted from the display memory, the save processing means may be arranged such that the partial data from the graphic memory are saved to the display memory, and when remaining pieces of partial data of the same frame data as the partial data previously outputted from the display buffer are outputted in succession, the remaining pieces of partial data from the graphic memory are saved to the buffer areas of the display memory. Further, the image transformation processing means may be arranged so as to carry out the predetermined transformation process on one or more pieces of partial data saved in the buffer areas, and to store results of the transformation process in the buffer areas except the buffer areas in which the partial data used for the transformation process has been saved and in which the pieces of partial data divided from the same frame data as the partial data have been saved.

Further, for example, in a case where the output interface is arranged so as to output "k" ("k" is an integer of "2" or more) video output signals at different refresh rates, the display memory is provided with "(n+2k−1)", where "n" is an integer that satisfies "n>2k−1", buffer areas, and pieces of partial data of the frame data equally divided into "n" parts by the save processing means are stored in the "n" buffer areas, when outputs of "(n−1)" pieces of partial data have ended at a fastest refresh rate, the save processing means may be arranged such that partial data of frame data of a next frame from the graphic memory is saved to the buffer areas except the buffer areas storing the partial data being outputted at another refresh rate and pieces of partial data to be outputted next at respective refresh rates.

According to the present invention, there is provided an image processing device including: image processing means for carrying out predetermined image processing per frame of a moving image and storing frame data representing an image corresponding to results of the image processing to a predetermined graphic memory; a display memory provided with "(n+1)", where "n" is an integer of "2" or more, display buffer areas, for storing the frame data in each of the buffer areas by dividing the frame data; an output memory provided with "(n−1)" output buffer areas whose storage capacity is larger than that of the display buffer area; save processing means for saving partial data of the frame data stored in the graphic memory and equally divided into "n" parts to each one of the "n" display buffer areas one by one; image transformation processing means for carrying out a predetermined transformation process on the partial data saved in the display memory to store a result of the processing indicating data whose data size is larger than that of the partial data in the output buffer; and an output interface for outputting the result of the processing stored in the output memory to the outside by transforming the result into a video output signal, in which, when "(n−1)" pieces of partial data are transformed by the image transformation processing means and outputted from the display memory, the save processing means saves "n" pieces of partial data from the graphic memory to the display memory.

According to the present invention, there is provided an image processing system including: image processing means for carrying out predetermined image processing per frame of a moving image, and for storing frame data representing an image corresponding to a result of the image processing to a predetermined graphic memory; a display memory provided with a plurality of buffer areas, for storing the frame data to each of the buffer areas by dividing the frame data; save processing means for saving the frame data stored in the graphic memory to the display memory; and an output interface for transforming the frame data saved in the display memory into video output signals and outputting the signals to the outside, in which: the save processing means is arranged so as to store the frame data stored in the graphic memory by equally dividing the frame data into a plurality of pieces of partial data in a number equal to or less than the number of buffer areas of the display memory and into a data size that can be stored in each of the buffer areas, to the buffer areas whose number corresponds to the number of the pieces of partial data; and the graphic memory and the display memory are provided in different units connected via a network.

According to the present invention, there is provided an image processing method executed in a device having save processing means for saving frame data representing an image corresponding to a result of predetermined image processing carried out per frame of a moving image from a graphic memory in which the frame data is stored to a predetermined display memory, and which causes a predetermined display unit to display the frame data saved in the display memory by transforming the frame data into a video output signal, the method comprising the steps of saving, by the save processing means, partial data obtained by equally dividing the frame data from the graphic memory to the display memory in a unit of partial data, and outputting the frame data saved to the display memory in the unit of partial data.

With such the image processing method, when the display memory has a plurality of buffer areas, the method further comprises generating, by the save processing means, pieces of partial data by equally dividing the frame data stored in the graphic memory in a number equal to or less than the number of buffer areas of the display memory and into a data size that can be stored in each of the buffer areas, and saving, by the save processing means, the pieces of partial data to the buffer areas whose number corresponds to the number of pieces of partial data.

A computer program according to the present invention is a computer program for a computer that saves frame data representing an image corresponding to a result of predetermined image processing carried out per frame of a moving image from a graphic memory in which the frame data is stored to a predetermined display memory, and which causes a predetermined display unit to display the frame data saved in the display memory by transforming the frame data into a video output signal, the computer program causing the computer to execute a process of saving the partial data obtained by equally dividing the frame data from the graphic memory to the display memory in a unit of partial data, and outputting the frame data saved in the display memory in the unit of partial data.

A semiconductor device according to the present invention is a semiconductor device that can be mounted in a device for carrying out predetermined image processing per frame of a moving image and displaying an image corresponding to a result of the image processing on a predetermined display unit, including: a graphic memory for storing frame data representing an image corresponding to a result of the image processing; a display memory for storing the frame data equally divided; save processing means for saving the frame data stored in the graphic memory to the display memory per piece of partial data obtained by equally dividing the frame data; and an output interface for transforming the frame data saved in the display memory into a video output signal per piece of partial data and outputting the signal to the display unit.

DETAILED DESCRIPTION OF THE INVENTION

Hereinafter, an embodiment of the present invention will be explained in detail.

Figure 1:
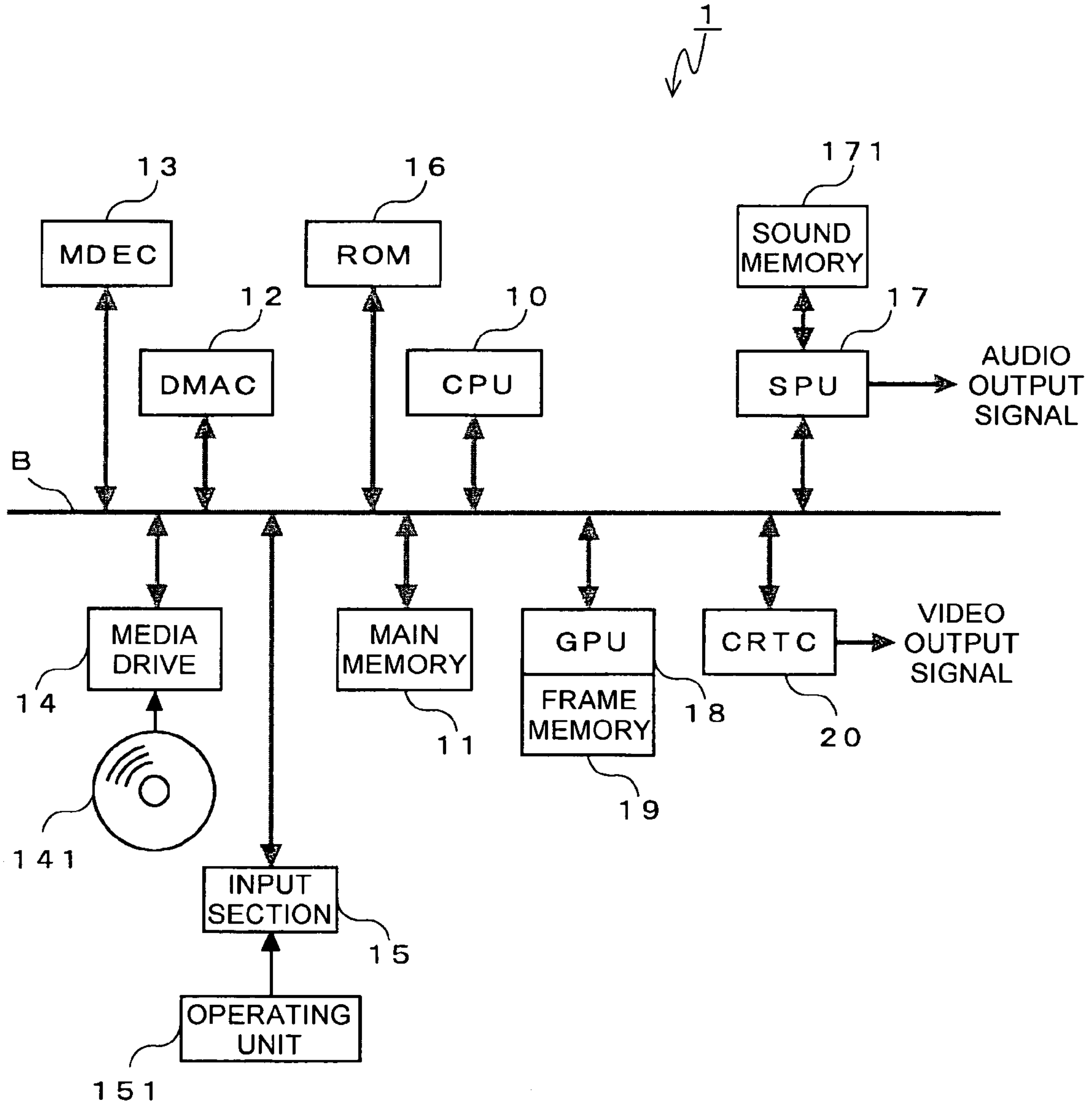
FIG. 1 is a diagram of a whole configuration of an image processing device according to an embodiment of the present invention.

FIG. 1 is a diagram showing a hardware configuration of an image processing device of the present invention. The image processing device 1 displays an image on a display unit (not shown) and outputs sounds from a speaker or the like by reading and processing programs and data stored in a media 141 such as a CD-ROM or a DVD-ROM. The image processing device 1 may be realized by, for example, a general-purpose computer, a video game machine, an entertainment device, and the like having an image processing function.

The image processing device 1 is composed of a CPU (Central Processing Unit) 10, a main memory 11 composed of a RAM, a DMAC (Direct Memory Access Controller) 12, an MPEG (Moving Picture Experts Group) decoder (MDEC) 13, a media drive 14 for mounting a media 141, a input section 15, a ROM 16 in which programs such as BIOS are recorded, a sound processing unit (referred to as "SPU" hereinafter) 17 for reading sound data accumulated in a sound memory 171 to output as audio output signal, a graphic processing unit (referred to as "GPU" hereinafter) 18 having a frame memory 19, the frame memory 19 in which images are drawn by the GPU 18, and a CRTC (CRT Controller) 20 for generating a video output signal. These are connected with each other through buses B.

The video output signal is generated in conformity with standards such as NTSC (National Television Standards Committee) and PAL (Phase Alternation by Line) and is outputted from the CRTC 20 to a display unit.

The CPU 10 is a semiconductor device that reads a starting program out of the ROM 16 in starting the image processing device 1, and executes the starting program to operate an operating system. The CPU 10 also controls the media drive 14 so as to read an application program out of the media 141 mounted to the media drive 14 and to store the read application program in the main memory 11. The CPU 10 further includes the functions of reading data necessary for generating an image such as 3-D graphic data (such as coordinate values of apexes of a polygon), texture data, and the like composed of a plurality of basic graphics (polygons) out of the media 141, and storing the data in the auxiliary storage unit 19. The 3-D graphic data represents an object image in a 3-D image.

The CPU 10 also includes the function of carrying out a geometric process such as coordinate transformation process and perspective transformation process on the 3-D graphic data to generate a display list containing contents of polygon definition information (specification of position, color, texture coordinates, fog color, and the like of the apex and center of gravity of the polygon to be used) obtained by the geometric process.

The GPU 18 is a semiconductor device that includes the function of generating a graphic image by rendering the polygons in the frame memory 19 by carrying out a rendering process by using the display list. The GPU 18 carries out the rendering process by the 3-D graphic data and texture data specified in the display list.

Although the image processing device 1 is provided with the CPU 10 and the GPU 18 as separate pieces of hardware, the image processing device 1 may use a processor unit having these functions at the same time.

The SPU 17 is a semiconductor device for generating an audio output signal by synthesizing sound data read out of the sound memory 171. The DMAC 12 is a semiconductor device for carrying out DMA transfer control on each circuit connected to the bus B, and the MDEC 13 is a semiconductor device that operates in parallel with the CPU 10 and includes the function of elongating data compressed by the method such as an MPEG (Moving Picture Experts Group) system or a JPEG (Joint Photographic Experts Group) system.

The input section 15 has a connection terminal 15*a* to which an input signal from an operating unit 151 is inputted. The operating unit 151 is provided with a plurality of operating buttons and an operator can move and deform an object image displayed on the display unit by variously operating these operating buttons. A keyboard, a mouse, a controller of a video game machine, and the like may be used as the operating unit 151, for example.

In the image processing device 1 configured as described above, a graphic image drawn in the frame memory 19 is equally divided and saved in the main memory 11. Data of the graphic image drawn in the frame memory 19 is referred to as frame data in this specification. The frame data of a first frame will be expressed as first frame data, the frame data of a second frame will be expressed as second frame data, and the frame data of an n-th frame will be expressed as n-th frame data. The data generated by being equally divided will be referred to as partial data in this specification. In the case of quadrisection, for example, the partial data of the first frame data will be expressed as partial data 1-1, 1-2, 1-3, and 1-4. The partial data of the n-th frame data will be expressed as partial data n-1, n-2, n-3, and n-4, respectively.

Figure 2:
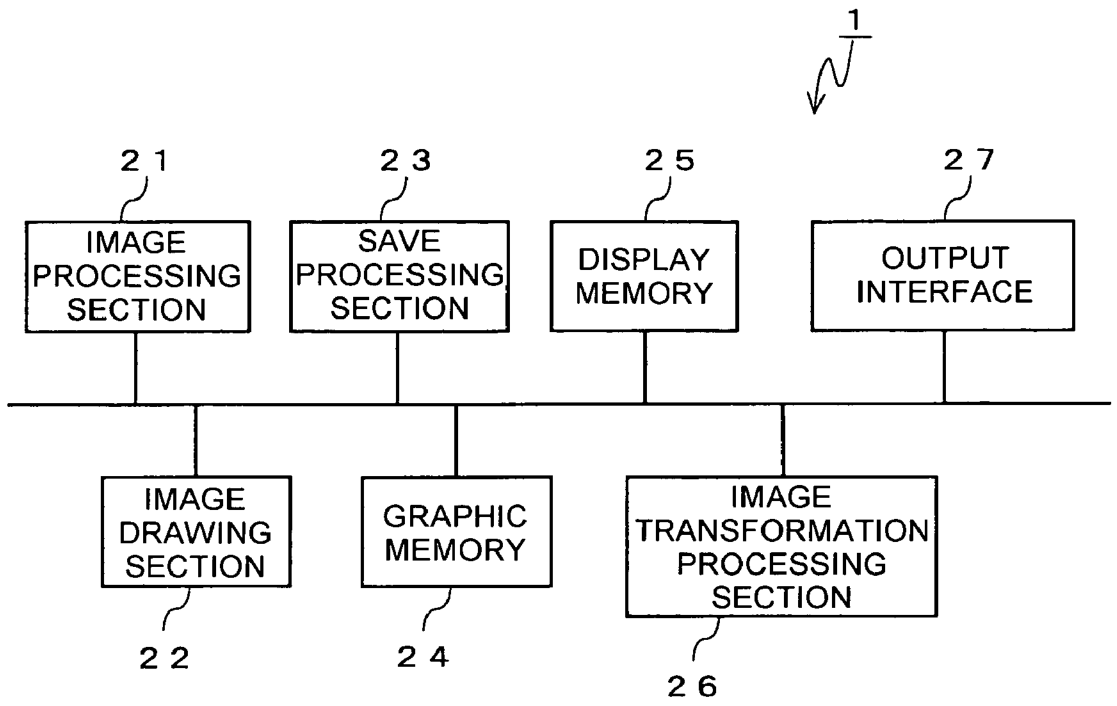
FIG. 2 is a functional block diagram of functions formed in the image processing device of the embodiment of FIG. 1.

Saving is carried out per piece of partial data. The CRTC 20 transforms the saved partial data into a video output signal and outputs the signal per piece of partial data. Therefore, a functional block as shown in FIG. 2 is formed by the CPU 10, the GPU 18, and the like in the image processing device 1. The CPU 10 and the GPU 18 form each functional block by executing programs recorded in the ROM 16, the media 141, and the like.

An image processing section 21, an image drawing section 22, a save processing section 23, a graphic memory 24, a display memory 25, an image transformation processing section 26, and an output interface 27 are formed in the image processing device 1. The image processing section 21 is composed of the CPU 10 and the image drawing section 22 is composed of the GPU 18. The save processing section 23 is composed of any one of the CPU 10, the GPU 18, and the CRTC 20, or in combination thereof. The graphic memory 24 is composed of the frame memory 19 and the display memory 25 is composed of the main memory 11. The output interface 27 is composed of the CRTC 20. The image transformation processing section 26 is composed either of the CPU 10 or the GPU 18, or in combination thereof.

It should be noted that although the image processing section 21 and the image drawing section 22 are shown as different functional blocks in this embodiment, it is possible to arrange a functional block having these functions at the same time.

The image processing section 21 generates the display list by carrying out the geometric process per frame of a moving image, and sends the generated display list to the image drawing section 22. When the image processing section 21 outputs the display list of an image of one frame to the image drawing section 22, the image processing section 21 is put into the state where the image processing section 21 can execute the geometric process for an image of a next frame. The geometric process of the image of the next frame is executed, for example, so that a display list of the frame is generated before the drawing of an image to the graphic memory 24 carried out by the image drawing section 22 ends.

The image drawing section 22 draws the polygons to the graphic memory 24 based on the display list sent from the image processing section 21, and generates a graphic image in that frame. Accordingly, the frame data is stored in the graphic memory 24. When the image drawing section 22 receives notification from the save processing section 23 that saving of the graphic image from the graphic memory 24 to the display memory 25 is finished, the image drawing section 22 is put into the state where the image drawing section 22 can render an image of the next frame.

The graphic memory 24 has a storage capacity sufficient for storing at least frame data for one frame. The graphic image (frame data) is saved in partial data units (which may be equal in size) when it is saved from the graphic memory 24 to the display memory 25. However, while the graphic image is stored in the graphic memory 24, it is stored without being divided.

The display memory 25 is provided with buffer areas each having a storage capacity sufficient for storing only one piece of partial data, in a number sufficient for storing frame data of at least one frame and less than two frames. When the image is divided into four, the display memory 25 is provided with four to seven buffer areas. When the display memory 25 outputs the partial data as video output signals, the display memory 25 outputs the signals per piece of partial data. Although the respective buffer areas may be configured physically by separate memories, the buffer areas are logically divided and formed within the main memory 11 in this embodiment.

Although the embodiment in which the display memory 25 is provided with the respective buffer areas will be explained in this embodiment for ease of comprehension of the present invention, it is not necessary for the display memory 25 to be provided with the buffer areas as long as the frame data is stored in the units of partial data. That is, the display memory 25 needs to be at least provided with a storage capacity sufficient for storing partial data of frame data of at least one frame and less than two frames.

The save processing section 23 generates the partial data by equally dividing the frame data stored in the graphic memory 24, and saves the frame data to the display memory 25 in the units of partial data. The save processing section 23 is also arranged so as to output the frame data from the display memory 25 in the unit of partial data. Therefore, the save processing section 23 is arranged so as to be able to confirm states of rendering of graphic image to the graphic memory 24, states of saving of the frame data from the graphic memory 24 to the display memory 25, and states of output from the display memory 25. It should be noted that although saving and output of the partial data is basically carried out one piece each time, necessary number of partial data may be saved and outputted at once when a plurality of pieces of partial data are saved and outputted continuously.

The save processing section 23 confirms the states of saving of the frame data from the graphic memory 24 to the display memory 25 and the states of output from the display memory 25 by being informed of from which buffer area within the display memory 25 the partial data is outputted. That is, the save processing section 23 confirms the saving and output states of the frame data by managing the input and output of data to/from the display memory 25.

The image transformation processing section 26 carries out a transformation process on the graphic image saved to the display memory 25. The transformation process includes enlargement and reduction of a graphic image, for example. The image transformation processing section 26 can execute the process for enlarging or reducing the graphic image with respect to one piece of partial data.

Figure 3:
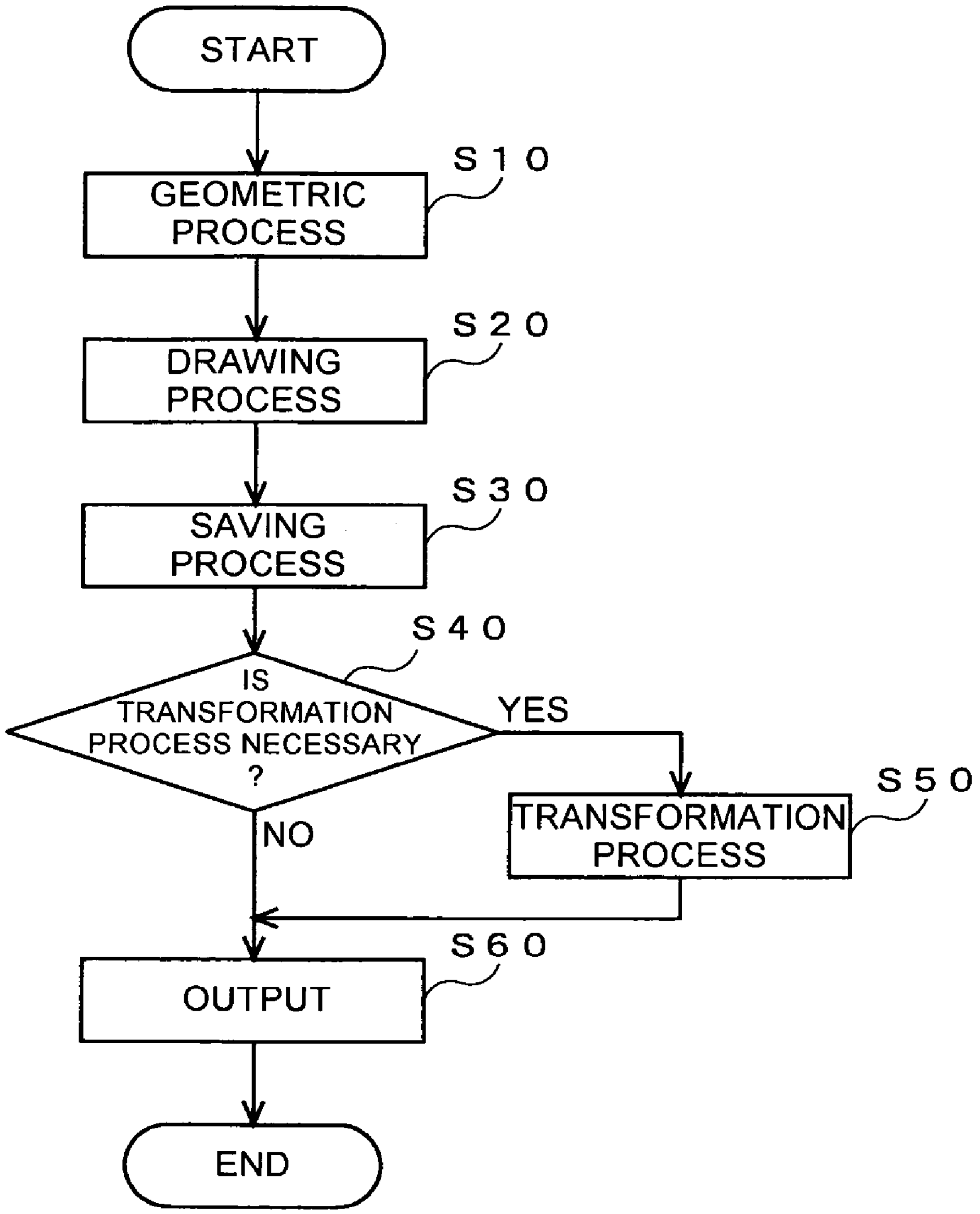
FIG. 3 is a flowchart showing processing of the image processing device of the embodiment of FIG. 1.

FIG. 3 is a chart showing a flow of processes for saving and outputting the frame data executed by the image processing device 1 as described above. Although FIG. 3 shows only the flow of image processing for one frame and shows nothing about the next frame, when the moving image is actually displayed, the processes shown in FIG. 3 are repeated until a moving image ends.

When an instruction is given to display a moving image, the image processing section 21 carries out a geometric process necessary for the image to be displayed (Step S10). Through the geometric process, the image processing section 21 generates a display list and sends the display list to the image drawing section 22. Based on the display list sent from the image processing section 21, the image drawing section 22 generates a graphic image by rendering the polygons in the graphic memory 24 (Step S20). Accordingly, the frame data is stored in the graphic memory 24.

When the process for drawing to the graphic memory 24 ends, the save processing section 23 saves the frame data written to the graphic memory 24 to the display memory 25 in accordance with the output state of the display memory 25 (Step S30). The save processing section 23 equally divides the frame data written to the graphic memory 24 to generate the partial data, the generated pieces of partial data being saved per piece of partial data. When the display memory 25 has at least one buffer area into which no partial data is written, the save processing section 23 can save the partial data. For example, when one piece of partial data is outputted from the display memory 25, buffer areas corresponding to that piece of partial data become vacant. Thus, the save processing section 23 can save one piece of partial data from the graphic memory to the display memory 25. Still more, a plurality of pieces of partial data can be saved from the graphic memory to the display memory 25 after outputting the plurality of pieces of partial data from the display memory 25.

The image transformation processing section 26 judges whether or not the transformation process must be carried out on the partial data saved to the display memory 25, and carries out the transformation process if necessary (Yes in Step S40, Step S50). The partial data after the transformation process is stored again in the display memory 25. When the transformation process ends or when the transformation process is not necessary (No in Step S40), the partial data is outputted from the display memory 25 via the output interface 27 (Step S60). The instruction on whether or not the transformation process must be carried out is given to the image transformation processing section 26 in advance. For example, when an image must be enlarged or reduced corresponding to a resolution of a display unit connected to the image processing device 1, the image transformation processing section 26 is instructed that the transformation process is necessary.

Concrete operations of the processes for saving and outputting the frame data executed by the image processing device 1 will be explained below with reference to FIGS. 4 to 12. FIGS. 4 to 12 are illustrations showing flows of the frame data stored in the graphic memory 24 and the display memory 25 in saving and outputting the frame data of a graphic image. In FIGS. 4 to 12, states are shown of the data transit from up to down in the figures. It should be noted that although the graphic memory 24 is shown as if it is divided in the explanation of FIG. 4 and subsequent figures, its purpose is to facilitate the explanation and the figures do not intend to represent that the graphic memory 24 is physically and logically divided.

First Embodiment

Figure 4:
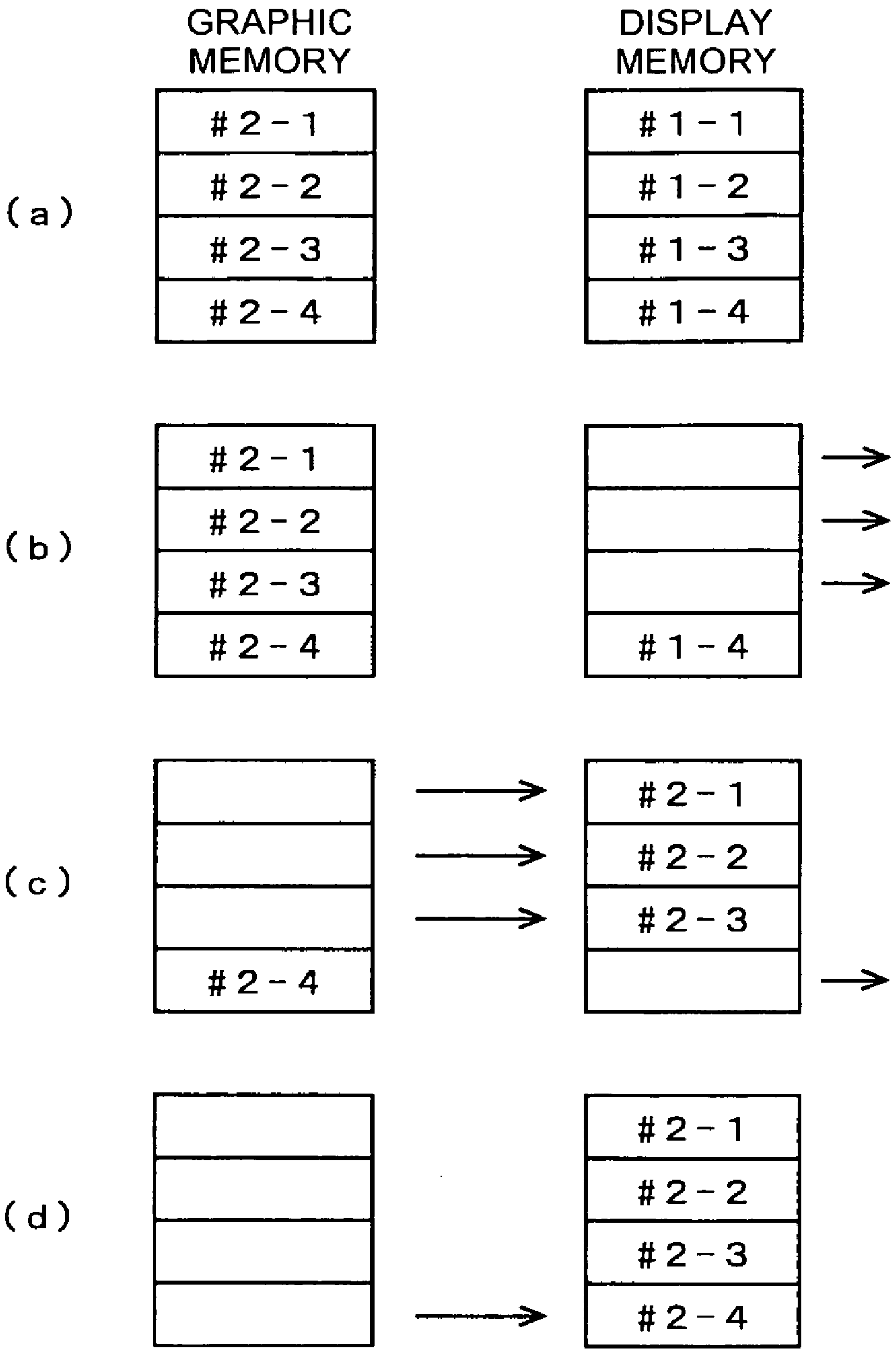
FIGS. 4*a-d* are exemplary illustrations of a saving process of the present invention.

In FIGS. 4(*a*) to 4(*d*), the display memory 25 has four buffer areas so as to be able to store four pieces of partial data (one piece of frame data).

In FIG. 4(*a*), a second frame data is stored in the graphic memory 24 and a quadrisected first frame data is saved and stored in the display memory 25. When pieces of partial data 1-1 through 1-3 are outputted sequentially from the display memory 25 via the output interface 27 (FIG. 4(*b*)), the save processing section 23 saves the pieces of partial data 2-1 through 2-3 obtained by equally dividing the second frame data from the graphic memory 24 to the display memory 25 after confirming that the partial data 1-3 has been outputted. While the pieces of partial data 2-1 through 2-3 are saved, the partial data 1-4 is outputted from the display memory 25 via the output interface 27 in succession to the output of the partial data 1-3 (FIG. 4(*c*)). When the partial data 1-4 has been outputted, the partial data 2-4 is saved from the graphic memory to the display memory (FIG. 4(*d*)). When the saving of the partial data 2-4 ends, third frame data, that becomes a graphic image of the next frame, starts to be rendered in the graphic memory 24.

This is an embodiment of the simplest saving and outputting processes. The display memory 25 only needs to have a storage capacity for one piece of frame data. Still more, because the saved frame data is immediately outputted, latency becomes shorter than in the case of the conventional method employing the double-buffer structure. Further, because the frame data is outputted per piece of partial data, the frame data only needs to be saved before the partial data is actually outputted even when the process exceeds the VBI interval.

Second Embodiment

Figure 5:
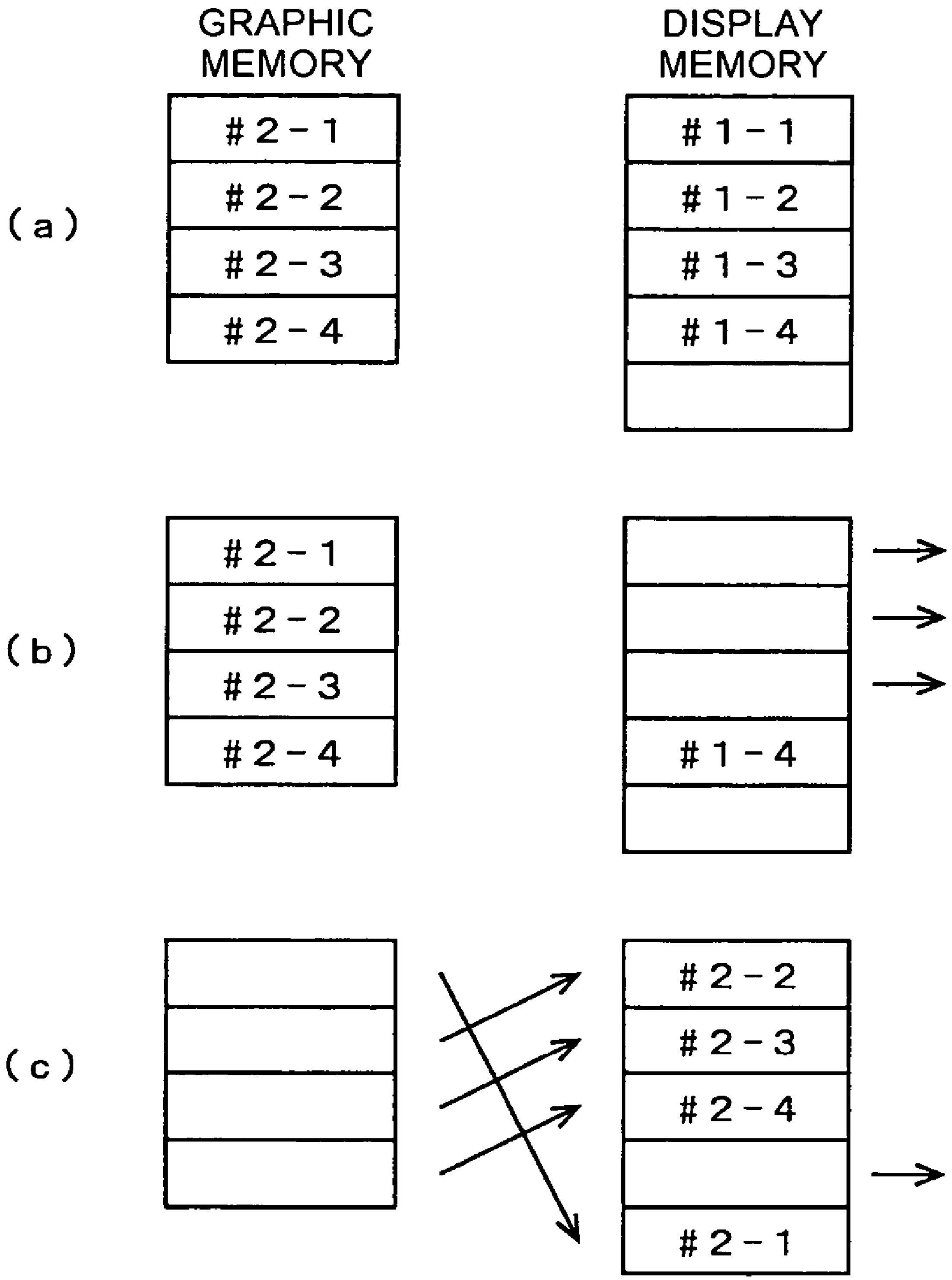
FIGS. 5*a-c* are exemplary illustrations of the saving process of the present invention.

In FIGS. 5(*a*) to 5(*c*), the display memory 25 has five buffer areas so as to be able to store five pieces of partial data.

In FIG. 5(*a*), a second frame data is stored in the graphic memory 24 and a quadrisected first frame data is saved and stored in the display memory 25. When pieces of partial data 1-1 through 1-3 are outputted sequentially from the display memory 25 via the output interface 27 (FIG. 5(*b*)), the save processing section 23 saves pieces of partial data 2-1 through 2-4 obtained by equally dividing the second frame data from the graphic memory 24 to the display memory 25 after confirming that the partial data 1-3 has been outputted. At the same time, the save processing section 23 causes the display memory 25 to output the partial data 1-4 (FIG. 5(*c*)). Because the display memory 25 can store five pieces of partial data, the display memory 25 can save all of the second frame data at once regardless of whether the partial data 1-4 is being outputted.

After saving the pieces of partial data 2-1 through 2-4, the image drawing section 22 can start to render a third frame data that becomes a graphic image of the next frame regardless of the output from the display memory 25. That is, the third frame data is rendered in the graphic memory 24 regardless of whether the partial data 1-4 is being outputted.

Because the saved frame data is immediately outputted, latency becomes shorter than in the case of the conventional method employing the double-buffer structure. Further, because the frame data is outputted per piece of partial data, the frame data only needs to be saved before the partial data is actually outputted even when the process exceeds the VBI interval.

Because the display memory 25 is arranged so as to be capable of storing one piece of extra partial data, all pieces of partial data of the next frame may be saved from the graphic memory 24 even when all pieces of partial data saved in the display memory 25 are not outputted. Therefore, output from the display memory 25 and drawing to the graphic memory 24 may be carried out asynchronously.

Third Embodiment

Figure 6:
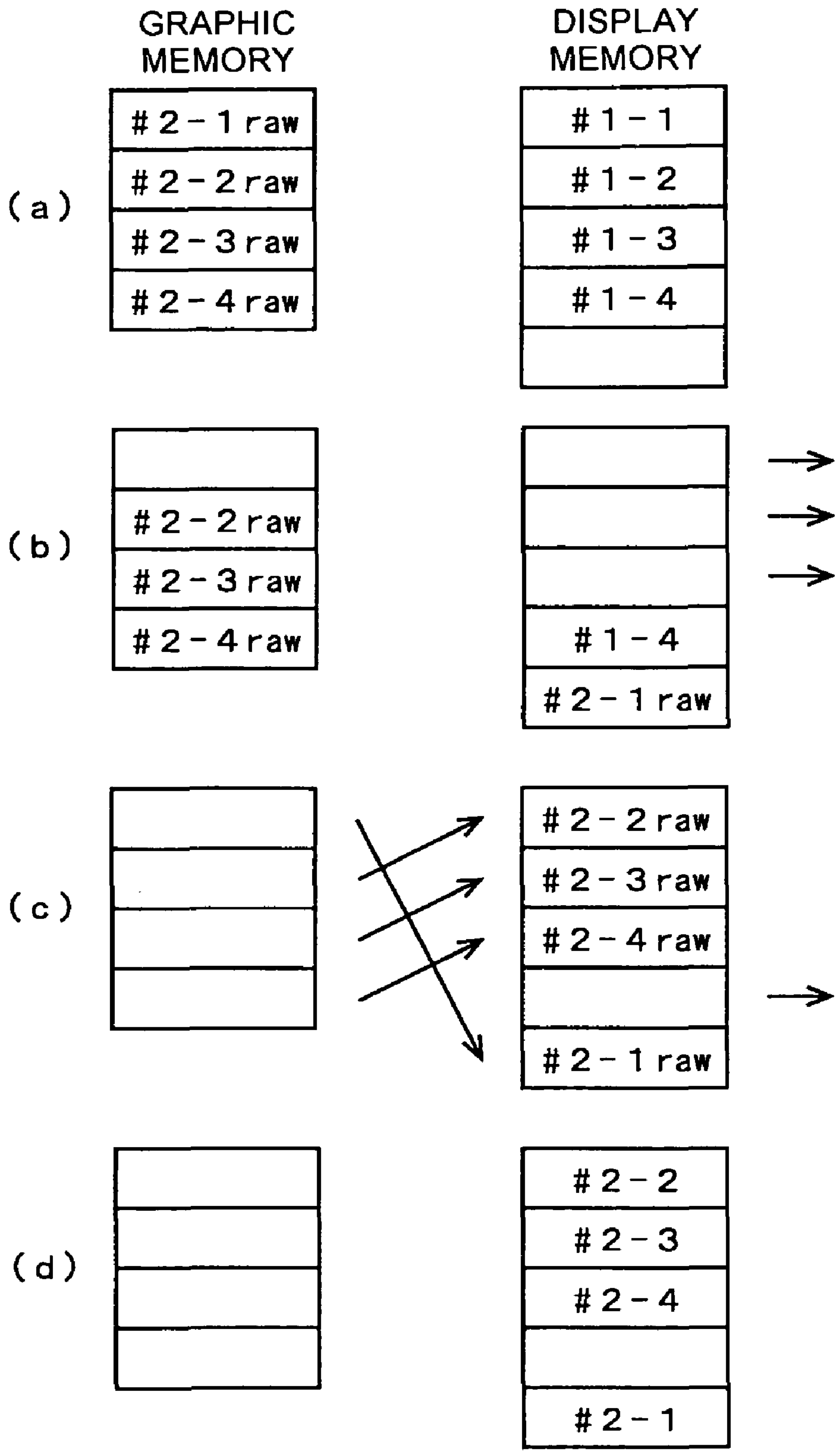
FIGS. 6*a-d* are exemplary illustrations of the saving process of the present invention.

In FIGS. 6(*a*) to 6(*d*), the display memory 25 has five buffer areas so as to be capable of storing five pieces of partial data. The display memory 25 is a memory that allows an in-place transformation process and is arranged so as to be capable of writing partial data after the transformation process into the same buffer area as the buffer area in which partial data before the transformation is to be stored.

In FIG. 6(*a*), a second frame data is stored in the graphic memory 24 and a quadrisected first frame data is saved and transformed to be stored in the display memory 25. When pieces of partial data 1-1 through 1-3 are outputted sequentially from the display memory 25 via the output interface 27 (FIG. 6(*b*)), the save processing section 23 saves pieces of partial data 2-1 raw through 2-4 raw obtained by equally dividing the second frame data from the graphic memory 24 to the display memory 25 after confirming that the partial data 1-3 has been outputted. At the same time, the save processing section 23 causes the display memory 25 to output the partial data 1-4 (FIG. 6(*c*)).

Next, the image transformation processing section 26 carries out the in-place transformation process of the pieces of partial data 2-1 raw through 2-4 raw saved in the display memory 25. Accordingly, the pieces of partial data 2-1 through 2-4 after the transformation process are stored in the display memory 25 (FIG. 6(*d*)).

Because the in-place transformation of the display memory 25 can be carried out while maintaining the same effect as that of the second embodiment, the display memory 25 will only need five buffer areas even when the transformation process is carried out after the saving.

Fourth Embodiment

Figure 7:
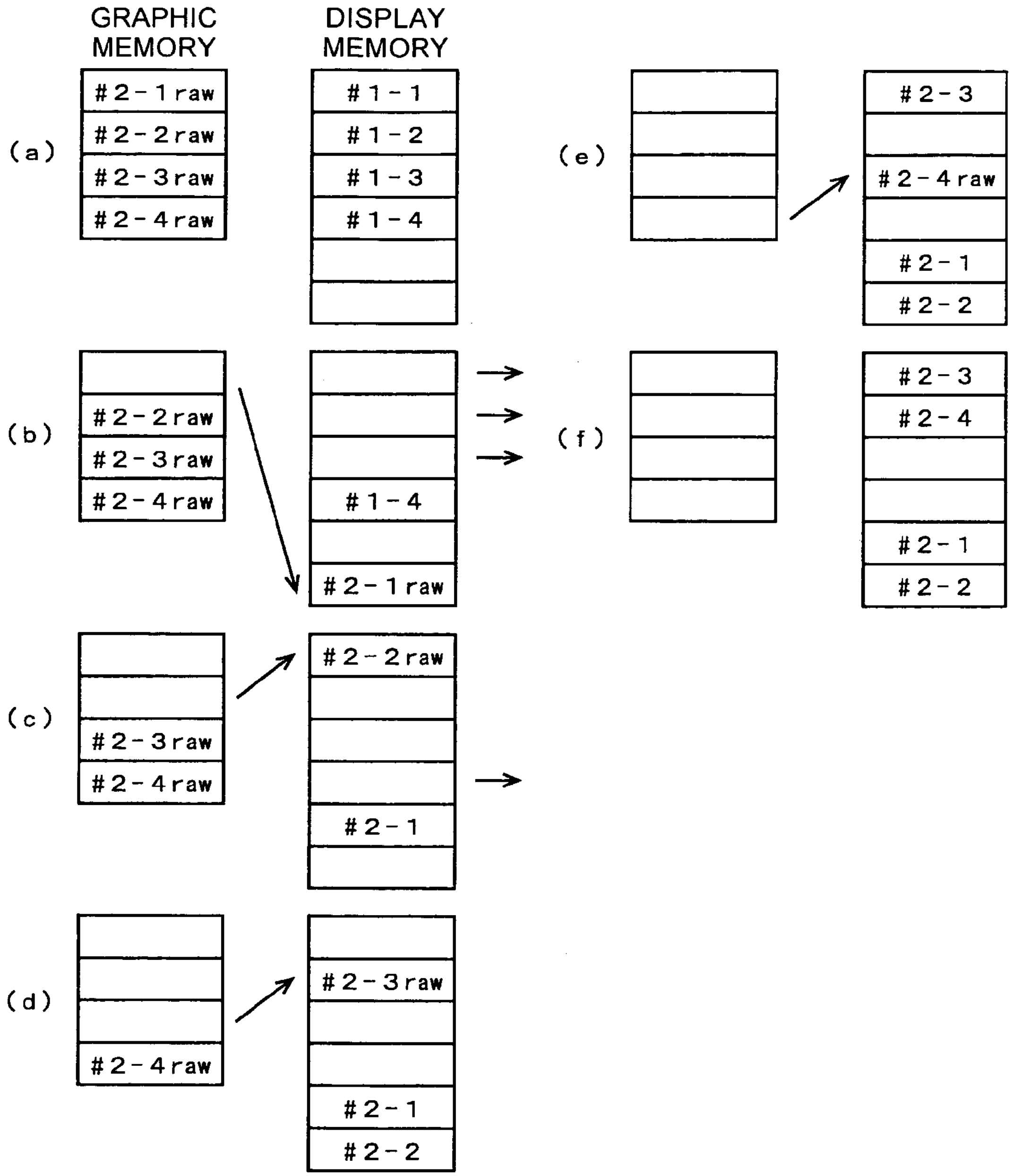
FIGS. 7*a-f* are exemplary illustrations of the saving process of the present invention.

In FIGS. 7(*a*) to 7(*f*), the display memory 25 has six buffer areas so as to be able to store six pieces of partial data. The display memory 25 is a memory incapable of performing the in-place transformation process and partial data after the transformation process cannot be written into the same buffer area as the buffer area in which the partial data before the transformation is to be stored.

In FIG. 7(*a*), a second frame data is stored in the graphic memory 24 and a quadrisected first frame data is saved and transformed to be stored in the display memory 25. When pieces of partial data 1-1 through 1-3 are outputted sequentially from the display memory 25, the save processing section 23 saves partial data 2-1 raw obtained by equally dividing the second frame data from the graphic memory 24 to the display memory 25 after confirming that the partial data 1-3 has been outputted (FIG. 7(*b*)). Next, in parallel with the transformation process of the partial data 2-1 raw carried out by the image transformation processing section 26, the save processing section 23 saves the partial data 2-2 raw from the graphic memory 24 to the display memory 25. At the same time, the save processing section 23 causes the display memory 25 to output the partial data 1-4 (FIG. 7(*c*)). The image transformation processing section 26 carries out the transformation process of the partial data 2-1 raw and stores the partial data 2-1 obtained as a result in a buffer area different from a buffer area in which the partial data 2-1 raw has been stored.

Next, in parallel with the transformation process of the partial data 2-2 raw carried out by the image transformation processing section 26, the save processing section 23 saves the partial data 2-3 raw from the graphic memory 24 to the display memory 25 (FIG. 7(*d*)). Then, in parallel with the transformation process of the partial data 2-3 raw carried out by the image transformation processing section 26, the save processing section 23 saves the partial data 2-4 raw from the graphic memory 24 to the display memory 25 (FIG. 7(*e*)). Next, the image transformation processing section 26 carries out the transformation process of the partial data 2-4 raw (FIG. 7(*f*)). The pieces of partial data 2-2, 2-3, and 2-4 after the transformation process are also stored in the buffer areas different from buffer areas in which the pieces of partial data 2-2 raw, 2-3 raw, and 2-4 raw have been saved. When saving of the partial data 2-4 raw ends, the image drawing section 22 starts to render a third frame data that becomes a graphic image of the next frame regardless of the output from the display memory 25. That is, when saving of the second frame data ends in FIG. 7(*e*), drawing of the next frame is started.

The fourth embodiment can obtain the same effect as in the third embodiment. Even when the in-place transformation by the display memory 25 cannot be carried out in this embodiment, it is possible to carry out the transformation process after the saving by increasing the storage capacity of the display memory 25 in an amount corresponding to one piece of partial data as compared with the third embodiment.

Fifth Embodiment

Figure 8:
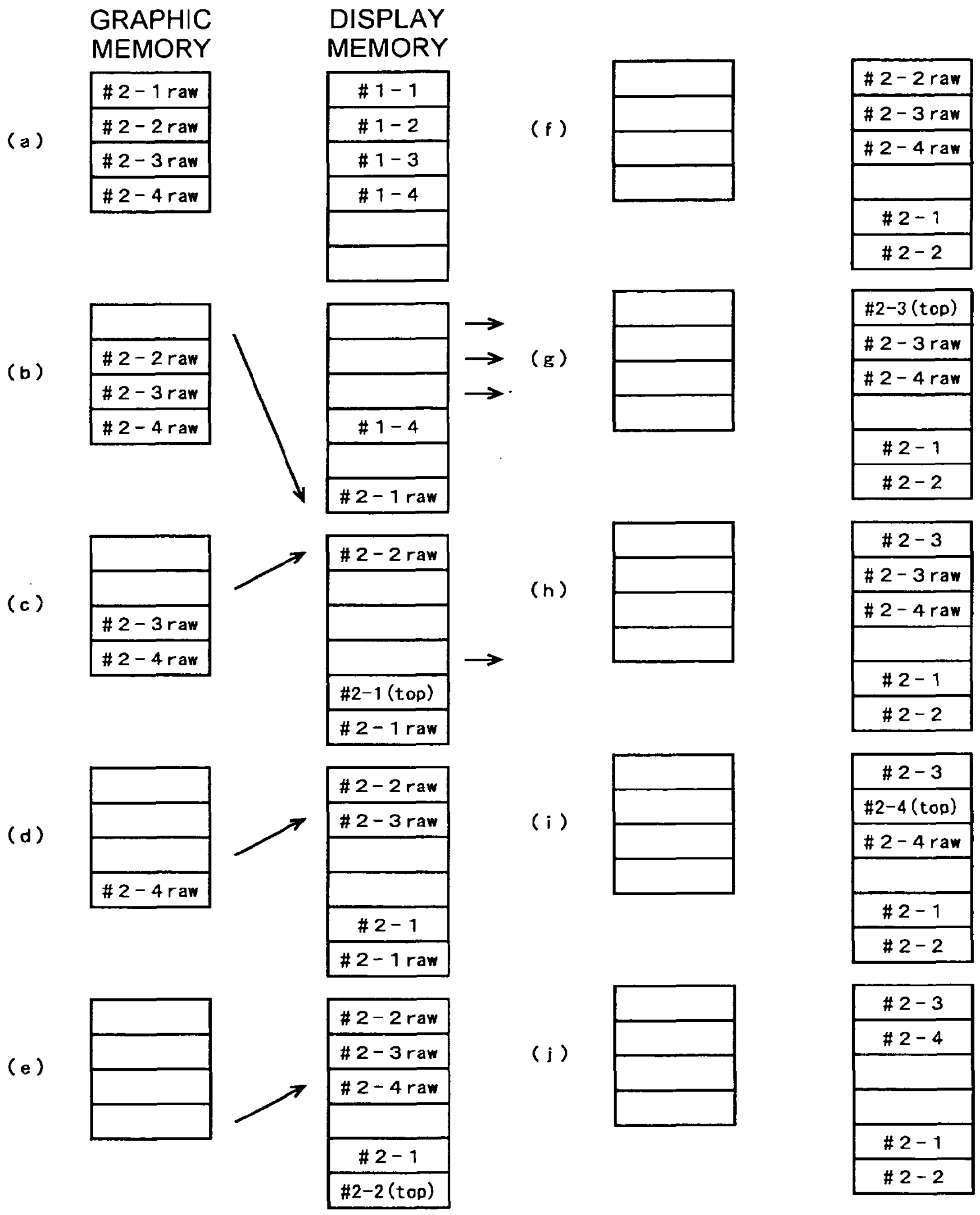
FIGS. 8*a-j* are exemplary illustrations of the saving process of the present invention.

In FIGS. 8(*a*) to 8(*j*), the display memory 25 has six buffer areas so as to be able to store six pieces of partial data. Upper and lower pieces of partial data are used for the transformation process. For example, pieces of partial data 2-1 raw and 2-3 raw are required beside partial data 2-2 raw in order to generate the partial data 2-2 by the transformation process.

In FIG. 8(*a*), a second frame data is stored in the graphic memory 24 and a quadrisected first frame data is saved and stored in the display memory 25. When pieces of partial data 1-1 through 1-3 are outputted sequentially from the display memory 25, the save processing section 23 saves partial data 2-1 raw obtained by equally dividing the second frame data from the graphic memory 24 to the display memory 25 after confirming that the partial data 1-3 has been outputted (FIG. 8(*b*)). Next, the image transformation processing section 26 carries out the transformation process of the upper half of the partial data 2-1 (partial data 2-1 (top)) by the partial data 2-1 raw. In parallel with the transformation process, the save processing section 23 saves the partial data 2-2 raw from the graphic memory 24 to the display memory 25. At the same time, the save processing section 23 causes display memory 25 to output the partial data 1-4 (FIG. 8(*c*)). The partial data 2-1 (top) after the transformation process is stored in a buffer area different from a buffer area in which the partial data 2-1 raw has been saved.

Next, the image transformation processing section 26 carries out the transformation process of the lower half of the partial data 2-1 by the pieces of partial data 2-1 raw and 2-2 raw. Accordingly, the transformation process of the partial data 2-1 ends. In parallel with the transformation process, the save processing section 23 saves the partial data 2-3 raw from the graphic memory 24 to the display memory 25 (FIG. 8(*d*)).

Next, the image transformation processing section 26 carries out the transformation process of the upper half of the partial data 2-2 (partial data 2-2 (top)) by the pieces of partial data 2-1 raw and 2-2 raw. In parallel with the transformation process, the save processing section 23 saves the partial data 2-4 raw from the graphic memory 24 to the display memory 25 (FIG. 8(*e*)). The partial data 2-2 (top) after the transformation process is stored in the buffer area in which the partial data 2-1 raw has been saved. Next, the image transformation processing section 25 carries out the transformation process of the lower half of the partial data 2-2 by the pieces of partial data 2-2 raw and 2-3 raw (FIG. 8(*f*)). Accordingly, the transformation process of the partial data 2-2 ends. It should be noted that saving of the second frame data has been finished by FIG. 8(*e*), so the image drawing section 22 may start drawing of the next frame in the graphic memory 24 in this stage.

Next, the image transformation processing section 26 carries out the transformation process of the upper half of the partial data 2-3 (partial data 2-3 (top)) by the pieces of partial data 2-2 raw and 2-3 raw (FIG. 8(*g*)). The partial data 2-3 (top) after the transformation process is stored in the buffer area in which the partial data 2-2 raw has been saved. Next, the image transformation processing section 26 carries out the transformation process of the lower half of the partial data 2-3 by the pieces of partial data 2-3 raw and 2-4 raw (FIG. 8(*h*)). Accordingly, the transformation process of the partial data 2-3 ends.

Next, the image transformation processing section 26 carries out the transformation process of the upper half of the partial data 2-4 (partial data 2-4 (top)) by the pieces of partial data 2-3 raw and 2-4 raw (FIG. 8(*i*)). The partial data 2-4 (top) after the transformation process is stored in the buffer area in which the partial data 2-3 raw has been saved. Next, the image transformation processing section 26 carries out the transformation process of the lower half of the partial data 2-4 by the partial data 2-4 raw (FIG. 8(*j*)). Accordingly, the transformation process of the partial data 2-4 ends.

The upper and lower pieces of partial data are used in the transformation process of the partial data in the fifth embodiment. Therefore, it becomes possible to eliminate problems such as color and shape of an image at boundary parts of the partial data being discontinuous.

Sixth Embodiment

Figure 9:
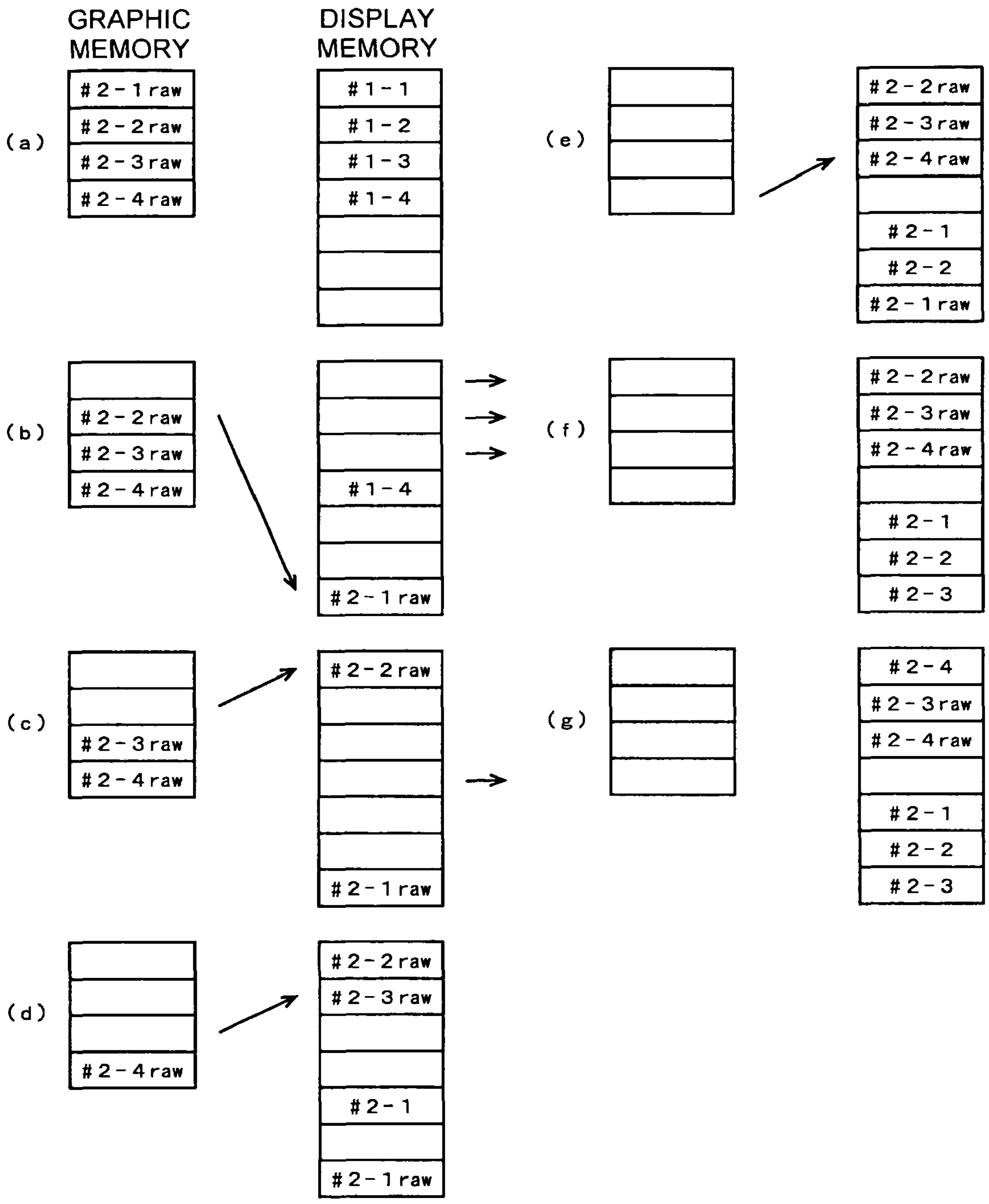
FIGS. 9*a-g* are exemplary illustrations of the saving process of the present invention.

In FIGS. 9(*a*) to 9(*d*), the display memory 25 has seven buffer areas so as to be able to store seven pieces of partial data.

In FIG. 9(*a*), a second frame data is stored in the graphic memory 24 and a quadrisected first frame data is saved and stored in the display memory 25. When pieces of partial data 1-1 through 1-3 are outputted sequentially from the display memory 25, the save processing section 23 saves partial data 2-1 raw obtained by equally dividing the second frame data from the graphic memory 24 to the display memory 25 after confirming that the partial data 1-3 has been outputted (FIG. 9(*b*)). Next, the save processing section 23 saves the partial data 2-2 raw from the graphic memory 24 to the display memory 25. At the same time, the save processing section 23 causes the display memory 25 to output the partial data 1-4 (FIG. 9(*c*)).

Next, the image transformation processing section 26 carries out the transformation process of the pieces of partial data 2-1 raw and 2-2 raw to generate the partial data 2-1. The generated partial data 2-1 is stored in a vacant buffer area of the display memory 25. Here, the generated partial data 2-1 is stored in a buffer area subsequent to the buffer area in which the partial data 1-4 has been stored. In parallel with the transformation process, the save processing section 23 saves the partial data 2-3 raw from the graphic memory 24 to the display memory 25 (FIG. 9(*d*)).

Next, the image transformation processing section 26 carries out the transformation process of the pieces of partial data 2-1 raw, 2-2 raw, and 2-3 raw to generate the partial data 2-2. In parallel with the transformation process, the save processing section 23 saves the partial data 2-4 raw from the graphic memory 24 to the display memory 25 (FIG. 9(*e*)). The generated partial data 2-2 is stored in a vacant buffer area of the display memory 25, i.e., in a buffer area subsequent to the buffer area in which the partial data 2-1 has been stored.

Next, the image transformation processing section 26 carries out the transformation process of the pieces of partial data 2-2 raw, 2-3 raw, and 2-4 raw to generate the partial data 2-3 (FIG. 9(*f*)). The generated partial data 2-3 is stored in a vacant buffer area of the display memory 25, i.e., in a buffer area subsequent to the buffer area in which the partial data 2-2 has been stored. It should be noted that because saving of the second frame data has been finished by FIG. 9(*e*), the image drawing section 22 may start to render the next frame in the graphic memory 24 in this stage.

Next, the image transformation processing section 26 carries out the transformation process of the pieces of partial data 2-3 raw and 2-4 raw to generate the partial data 2-4 (FIG. 9(*g*)). The generated partial data 2-4 is stored in a vacant buffer area of the display memory 25, i.e., in a buffer area subsequent to the buffer area in which the partial data 2-3 has been stored.

While the pieces of partial data 2-3 raw and 2-4 raw remaining in the display memory 25 may be deleted, they may be left and need not be deleted if they are arranged so as to be overwritten by the saving and transformation processes of the next frame.

While the upper and lower pieces of partial data are used in the transformation process in the sixth embodiment, the partial data is not further divided into the upper and lower halves unlike the fifth embodiment. Therefore, the transformation process of all pieces of partial data may be carried out quickly while keeping the same effects as that in the fifth embodiment.

Seventh Embodiment

Figure 10:
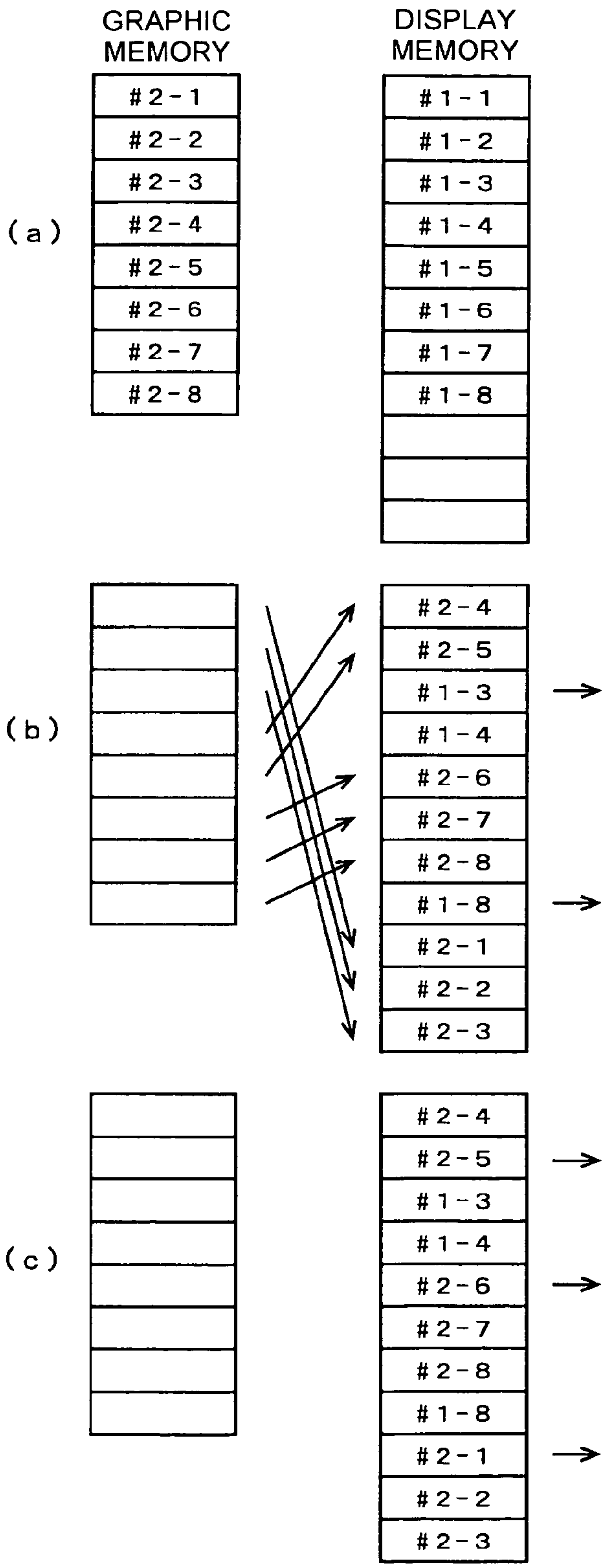
FIGS. 10*a-c* are exemplary illustrations of the saving process of the present invention.

In FIGS. 10(*a*) to 10(*c*), the frame data is divided into eight parts. The display memory 25 has eleven buffer areas so as to be able to store eleven pieces of partial data. Because each buffer area composing the display memory 25 has the storage capacity corresponding to a data size of the partial data, when the frame data is divided into eight parts, the storage capacity is half as that in the case where it is divided into four parts.

The seventh embodiment illustrates a case where video output signals are outputted to first and second output units whose refresh rates are different, and two video output signals are outputted from the output interface 27 in different refresh rates. Here, it is assumed that the refresh rate of the first output unit is relatively high and the refresh rate of the second output unit is relatively low.

In FIG. 10(*a*), a second frame data is stored in the graphic memory 24 and a first frame data divided into eight parts is saved and stored in the display memory 25. When the pieces of partial data 1-1 through 1-7 are outputted sequentially from the display memory 25 to the first output unit, the save processing section 23 saves pieces of partial data 2-1 through 2-8 obtained by equally dividing the second frame data at once from the graphic memory 24 to the display memory 25 even when the output of the partial data to the second output unit has not reached the partial data 1-8 yet (FIG. 10(*b*)). In FIG. 10(*b*), the second frame data is saved during the output of the partial data 1-3 to the second output unit.

Next, the display memory 25 outputs the partial data 2-1 to the first output unit after outputting the partial data 1-8. This is an output in normal sequence. The display memory 25 outputs the partial data 2-5 to the second output unit after outputting the partial data 1-4. Therefore, an image in which the first and second frame data are mixed is displayed on the second output unit.

Because the output to the first output unit and that to the second output unit are carried out asynchronously, there is a possibility that the output is carried out beyond a partial area during saving. Therefore, saving is carried out by leaving two buffer areas vacant for outputting to the second output unit.

Saving and output may be carried out in the same manner even when there are three or more output destinations. When the number of output destinations is represented by "k" ("k" is an integer of "2" or more) and the number of divisions of frame data is represented by "n" ("n" is an integer that satisfies "n>2k−1"), the number of buffer areas required for the display memory may be expressed by an equation "(n+2k−1)".

Eighth Embodiment

Figure 11:
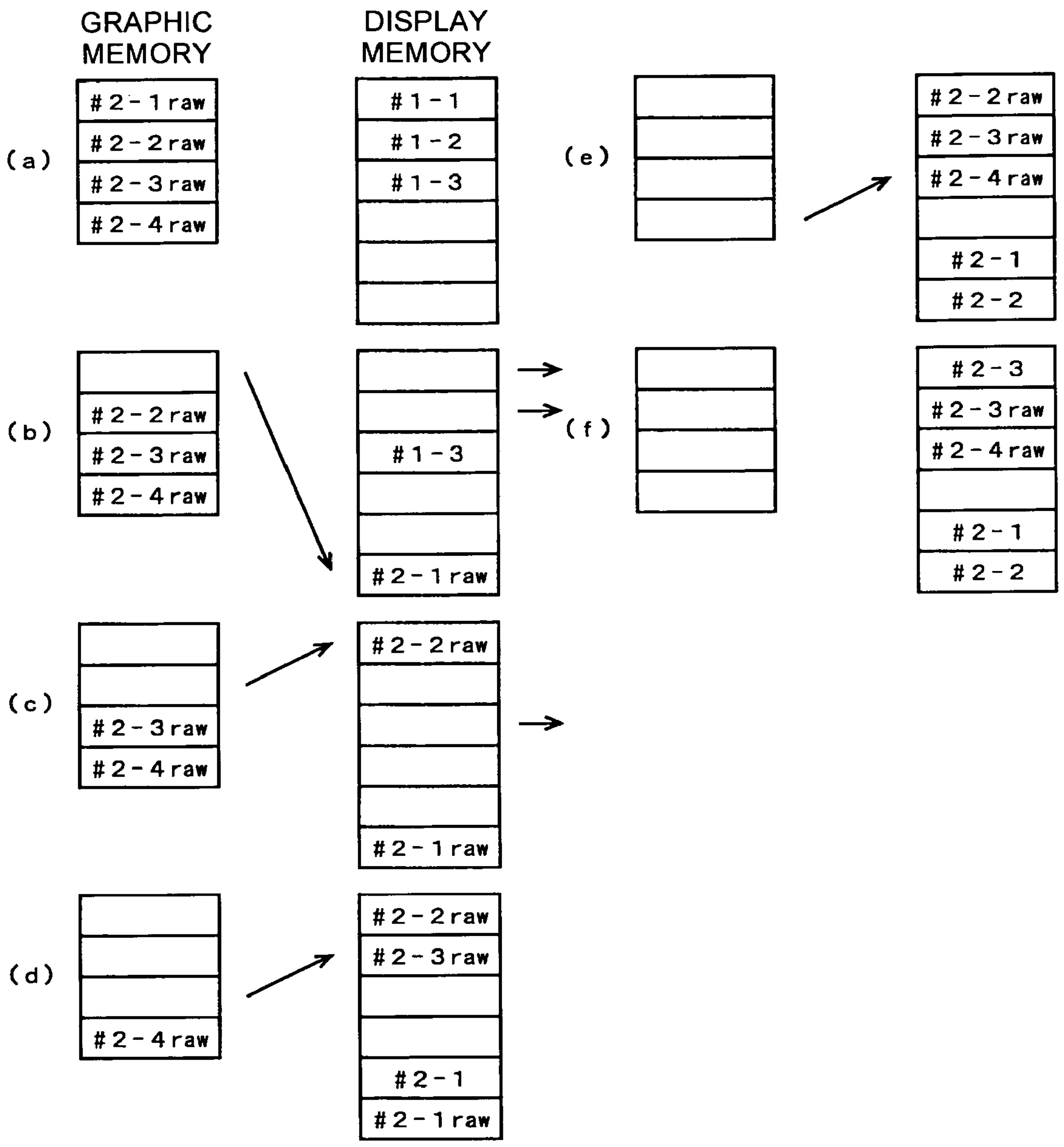
FIGS. 11*a-f* are exemplary illustrations of the saving process of the present invention.

In FIGS. 11(*a*) to 11(*f*), the frame data is divided into four parts. The display memory 25 has six buffer areas so as to be able to store six pieces of partial data.

The image transformation processing section 26 carries out a transformation process on the frame data after the saving so that an image is reduced in the eighth embodiment. Frame data composed of three pieces of partial data will be generated based on four pieces of partial data in this embodiment. Accordingly, the partial data saved in the display memory 25 is transformed into a ¾-size image by the image transformation processing section 26.

In FIG. 11(*a*), a second frame data is stored in the graphic memory 24 and a reduced and trisected first frame data is saved and stored in the display memory 25. Data size of the first frame data stored in the display memory 25 is ¾ the data size of the second frame data stored in the graphic memory 24.

When pieces of partial data 1-1 and 1-2 are outputted sequentially from the display memory 25, the save processing section 23 saves partial data 2-1 raw obtained by equally dividing the second frame data from the graphic memory 24 to the display memory 25 after confirming that the partial data 1-2 has been outputted (FIG. 11(*b*)). Next, the save processing section 23 saves the partial data 2-2 raw from the graphic memory 24 to the display memory 25. At the same time, the save processing section 23 causes the display memory 25 to output the partial data 1-3 (FIG. 9(*c*)).

Next, the image transformation processing section 26 generates the partial data 2-1 from the pieces of partial data 2-1 raw and 2-2 raw and the save processing section 23 saves the partial data 2-3 raw from the graphic memory 24 (FIG. 11(*d*)). Then, the image transformation processing section 26 generates the partial data 2-2 from the pieces of partial data 2-2 raw and 2-3 raw and the save processing section 23 saves the partial data 2-4 raw from the graphic memory 24 (FIG. 11(*e*)). Next, the image transformation processing section 26 generates the partial data 2-3 from the pieces of partial data 2-3 raw and 2-4 raw (FIG. 11(*f*)). Thus, the second frame data whose image is reduced to ¾ the size is generated.

The transformation process is carried out on the two pieces of partial data to generate one piece of partial data. Therefore, the number of divisions of the frame data after transformation becomes less than the number of divisions of the frame data before the transformation by one, so the image is reduced that much.

Ninth Embodiment

Figure 12:
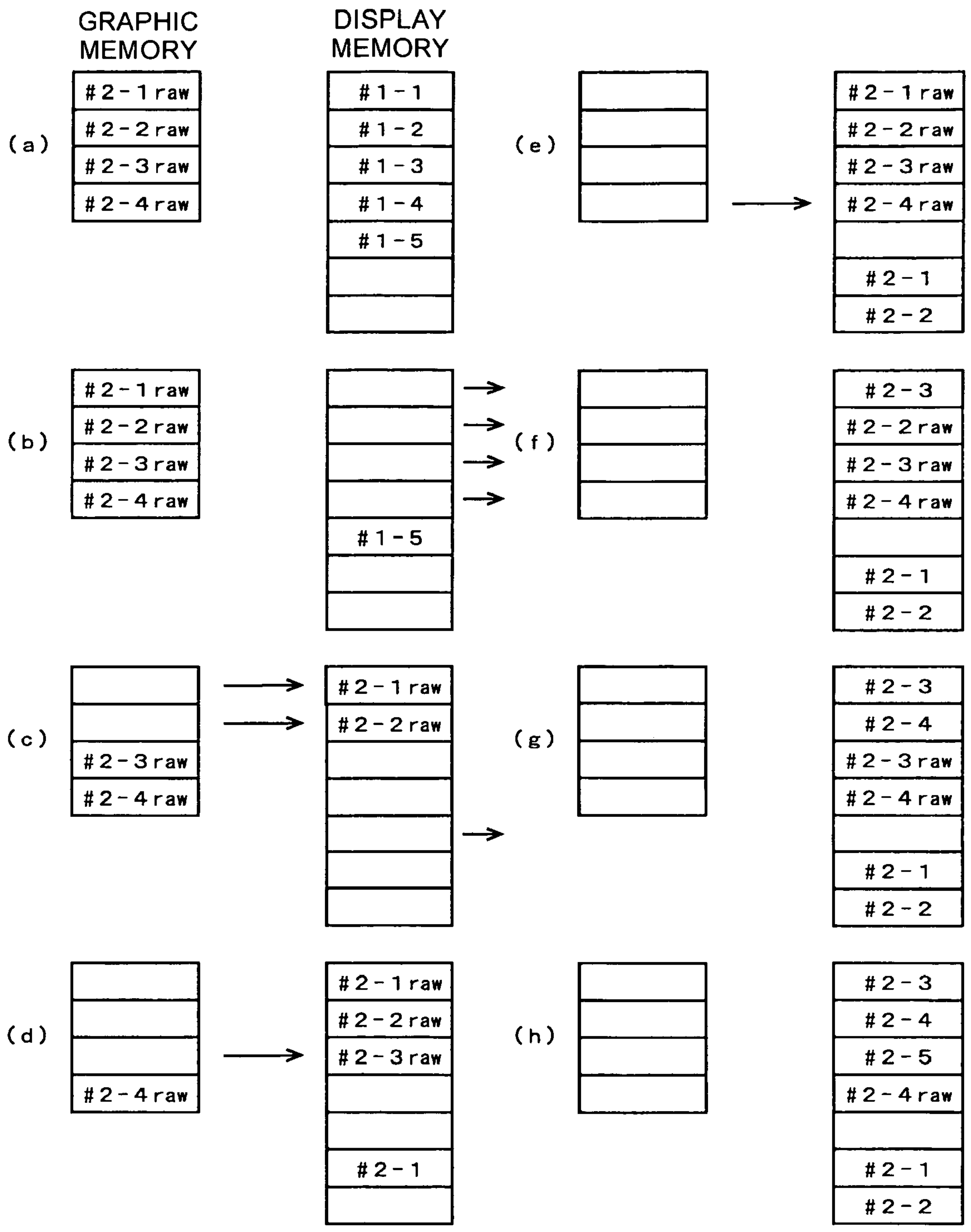
FIGS. 12*a-h* are exemplary illustrations of the saving process of the present invention.

In FIGS. 12(*a*) to 12(*h*), the frame data is divided into four parts. The display memory 25 has seven buffer areas so as to be able to store seven pieces of partial data.

In the ninth embodiment, the image transformation processing section 26 carries out a transformation process on the frame data after saving so that an image is enlarged. In this embodiment, frame data composed of five pieces of partial data is generated based on four pieces of partial data. That is, the partial data saved to the display memory 25 is transformed into a 5/4-size image by the image transformation processing section 26.

In FIG. 12(*a*), a second frame data is stored in the graphic memory 24 and a first frame data corresponding to five pieces of partial data is saved and transformed to be stored in the display memory 25. When output of the pieces of partial data 1-1 through 1-4 after the transformation process ends (FIG. 12(*b*)), the save processing section 23 saves pieces of partial data 2-1 raw and 2-2 raw obtained by equally dividing the second frame data from the graphic memory 24 to the display memory 25. At the same time, the save processing section 23 causes the display memory 25 to output the partial data 1-5 (FIG. 12(*c*)).

Next, the save processing section 23 saves the partial data 2-3 raw from the graphic memory 24 to the display memory 25 and the image transformation processing section 26 transforms the partial data 2-1 raw to generate the partial data 2-1 (FIG. 12(*d*)). Then, the save processing section 23 saves the partial data 2-4 raw from the graphic memory 24 to the display memory 25 and the image transformation processing section 26 transforms the pieces of partial data 2-1 raw and 2-2 raw to generate the partial data 2-2 (FIG. 12(*e*)).

Next, the image transformation processing section 26 transforms the pieces of partial data 2-2 raw and 2-3 raw to generate the partial data 2-3 (FIG. 12(*f*)). Then, the image transformation processing section 26 transforms the pieces of partial data 2-3 raw and 2-4 raw to generate the partial data 2-4 (FIG. 12(*g*)). Next, the image transformation processing section 26 transforms the partial data 2-4 raw to generate partial data 2-5 (FIG. 12(*h*)).

The image transformation processing section 26 carries out the transformation process on the pieces of partial data 2-1 raw and 2-4 raw to generate one piece of partial data each, and carries out the transformation process on the two pieces of partial data to generate one piece of partial data. Therefore, the number of divisions of the frame data after the transformation increases by one as compared with the number of divisions of the frame data before the transformation, so the image is enlarged that much. It should be noted that drawing of the third frame data may be started any time as long as the saving of the frame data from the graphic memory 24 to the display memory 25 has ended.

Tenth Embodiment

The tenth embodiment is an example of saving and outputting processes executed by an image processing device 2 whose configuration is different from the image processing device 1 used in the first to ninth embodiments described above. In the tenth embodiment, data size of the partial data after the transformation process is increased as compared with data size of partial data before the transformation process. Therefore, when the partial data after the transformation process is intended to be stored in each buffer area of the display memory 25, each of the buffer areas causes an overflow. Then, an output FIFO (First-In First-Out), for storing the partial data after the transformation process, stores the partial data after the transformation process in this embodiment.

Figure 13:
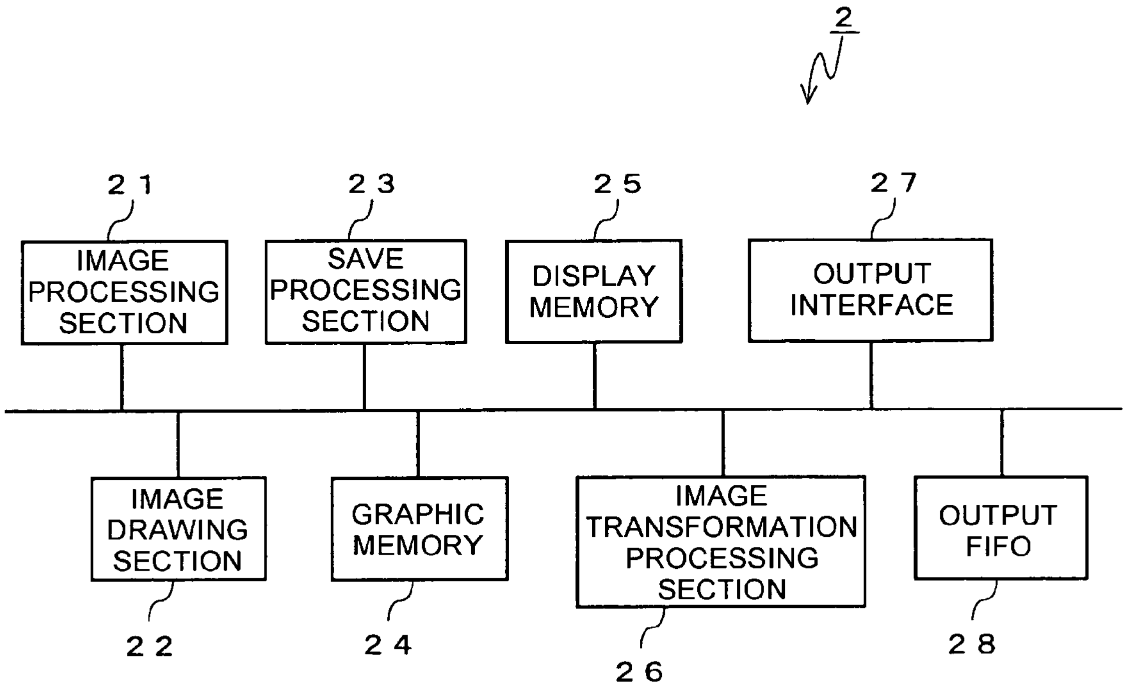
FIG. 13 is another functional block diagram of functions formed in the image processing device of the embodiment.

FIG. 13 is a functional block diagram of the image processing device 2 for realizing such the process. The same components as those in FIG. 2 are denoted by the same reference numerals. As compared to FIG. 2, a part in which an output FIFO 28 is added is different. The output FIFO 28 may be configured by the main memory 11 or another dedicated memory may be prepared. The output FIFO 28 is provided with three buffer areas sufficient for storing one piece of partial data after transformation process. A storage capacity of a buffer area provided in the output FIFO 28 is larger than a storage capacity of the buffer area provided in the display memory 25.

Figure 14:
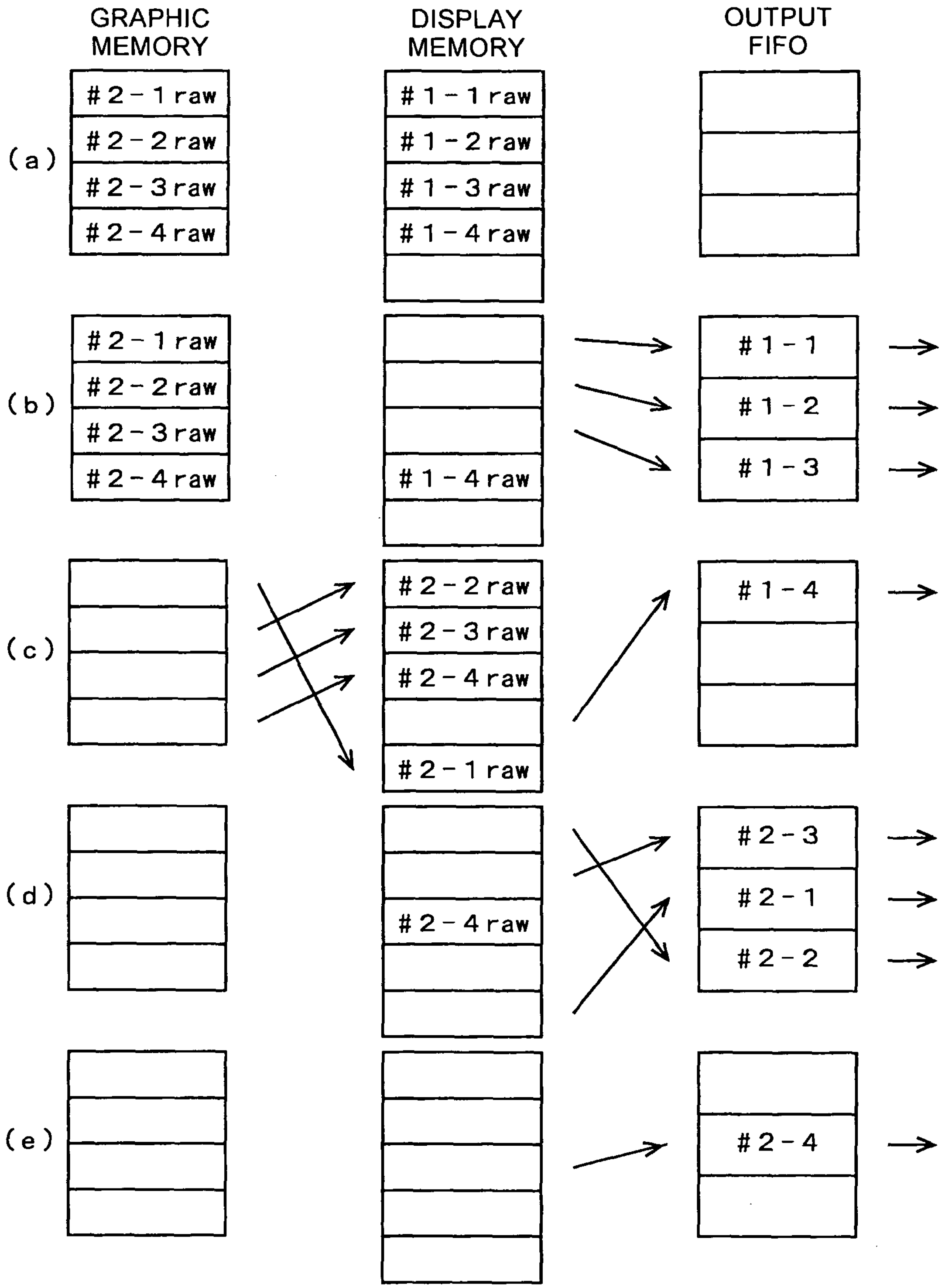
FIGS. 14*a-e* are exemplary illustrations of the saving process of the present invention.

FIGS. 14(*a*) to 14(*e*) explain processes carried out by the image processing device 2 shown in FIG. 13. The frame data is quadrisected in FIGS. 14(*a*) to 14(*e*). The display memory 25 is provided with five buffer areas so as to be able to store five pieces of partial data.

The frame data stored in the graphic memory 24 is transformed by the image transformation processing section 26 and is then written into the output FIFO 28 after being saved in the display memory 25. The output interface 27 outputs the transformed frame data from the output FIFO 28.

In FIG. 14(*a*), the second frame data is stored in the graphic memory 24 and the quadrisected first frame data is saved and stored in the display memory 25. Pieces of partial data 1-1 raw through 1-3 raw are sequentially transformed by the image transformation processing section 26 to be sent to the output FIFO 28 from the display memory 25, and are outputted in the stated order of the partial data 1-1, 1-2, and 1-3 (FIG. 14(*b*)).

Next, partial data 1-4 raw is transformed by the image transformation processing section 26, is sent to the output FIFO 28, and is outputted. In parallel with this, the save processing section 23 saves pieces of partial data 2-1 raw through 2-4 raw obtained by equally dividing the second frame data from the graphic memory 24 to the display memory 25 (FIG. 14(*c*)).

When the saving of the pieces of partial data 2-1 raw through 2-4 raw ends, the saved pieces of partial data 2-1 raw through 2-3 raw are sequentially transformed by the image transformation processing section 26, are sent to the output FIFO 28 from the display memory 25, and are outputted in the stated order of the partial data 2-1, 2-2, and 2-3 (FIG. 14(*d*)). Next, the partial data 2-4 raw is transformed by the image transformation processing section 26, is sent to the output FIFO 28, and is outputted (FIG. 14(*e*)). The third frame data is written to the graphic memory 24 in and after the stage of FIG. 14(*d*) at which all pieces of the second frame data are saved from the graphic memory 24.

Because data size of partial data becomes large by the transformation process, it becomes possible to obtain larger images and images with higher definition in this embodiment.

Although the image processing device 1 described above has the configuration in which the display memory 25 is provided within one device, the display memory 25 may be provided outside the image processing device 1. For example, the display memory 25 may be provided within the display unit connected with the image processing device 1 so as to directly transmit frame data from the graphic memory 24 without the intermediation of the CRTC 20 and the like. In this case, the frame data is transformed into a video output signal within the display unit.

Figure 15:
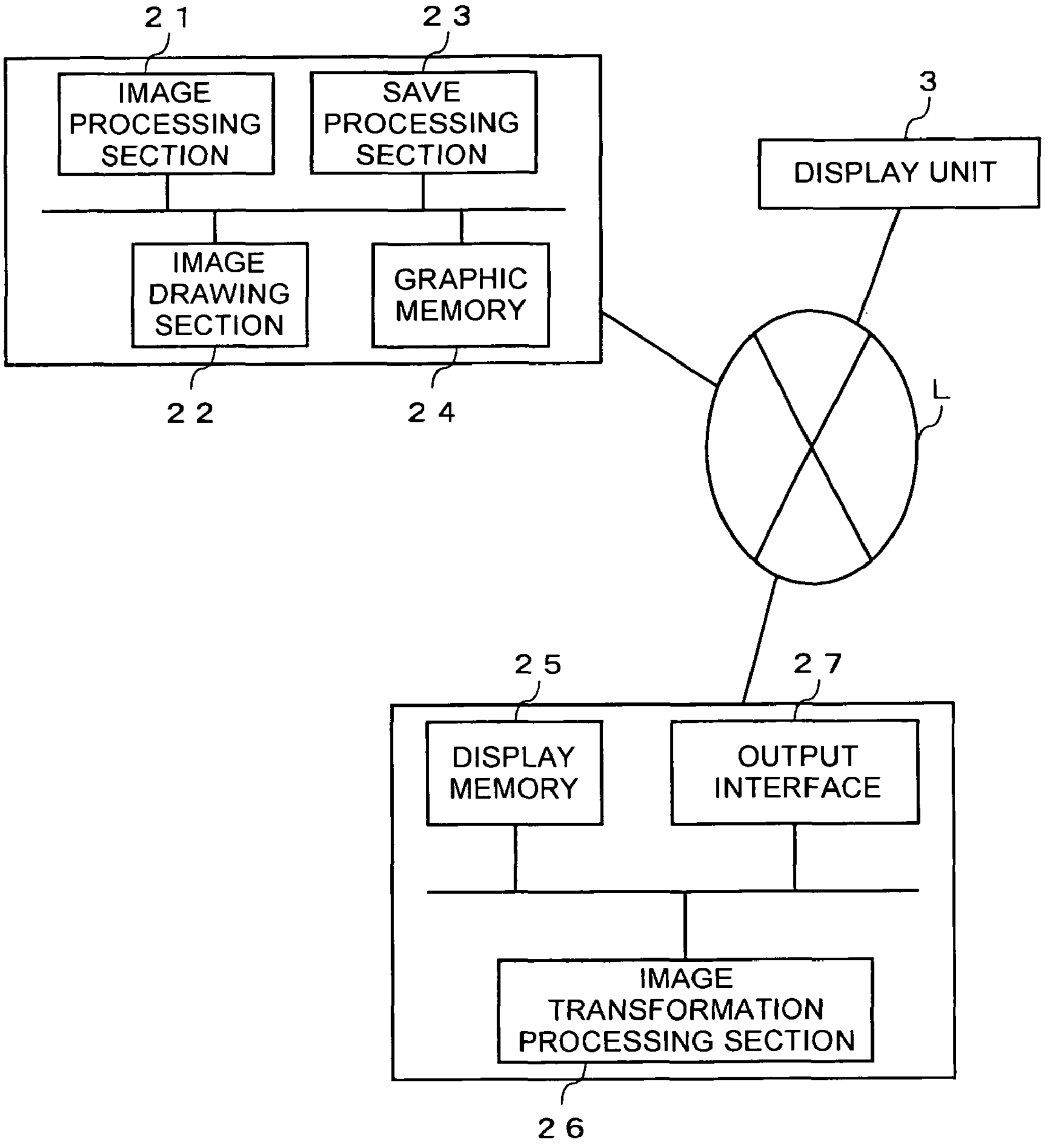
FIG. 15 is an exemplary illustration of the image processing device using a network.

Still more, the display memory 25 may be provided within a separate unit via a network. FIG. 15 is an exemplary illustration of an image processing device utilizing the network. The display memory 25, the image transformation processing section 26, and the output interface 27 are provided on the network L by being separated from the image processing device 1 of FIG. 2. The frame data drawn into the graphic memory 24 is saved to the display memory 25 via the network L. Further, the frame data is sent as a video output signal from the display memory 25 to the display unit 3 via the network. It should be noted that the display unit 3 may be provided with the display memory 25, the image transformation processing section 26, and the output interface 27.

The invention claimed is:

1. An image processing device, comprising:

image processing means for carrying out predetermined image processing per frame of a moving image, and storing frame data representing an image corresponding to a result of the image processing to a predetermined graphic memory;

save processing means for saving partial data obtained by equally dividing the frame data from the graphic memory to a predetermined display memory per piece of partial data, wherein:

the display memory has a plurality of buffer areas in a number sufficient for storing the frame data of less than two frames, the save processing means is arranged so as to store pieces of partial data, which are obtained by equally dividing the frame data stored in the graphic memory into a number equal to or less than the number of buffer areas of the display memory and into a data size that can be stored in each of the buffer areas, to the buffer areas whose number corresponds to the number of the pieces of partial data;

an output interface for outputting the partial data saved in the display memory to the outside by transforming the partial data into a video output signal per piece of partial data; and image transformation processing means for carrying out a predetermined transformation process on the pieces of partial data saved in the buffer areas of the display memory, and for storing results of the transformation process in the buffer areas in which the pieces of partial data have been stored.

2. An image processing device according to claim 1, wherein the save processing means is arranged to be able to confirm states of saving of the partial data from the graphic memory to the display memory and states of output of the partial data stored in the display memory, and to save the partial data from the graphic memory to the display memory in accordance with the output state of the partial data from the display memory.

3. An image processing device according to claim 1, wherein:

the display memory is provided with "n", which is an integer of "2" or more, buffer areas, and the pieces of partial data of the frame data equally divided into "n" parts by the save processing means are respectively stored in each of the buffer areas; and when "m", which is an integer represented by "1≦m≦(n−1)", pieces of partial data are outputted from the display memory, the save processing means saves "m" pieces of partial data among frame data of a next frame stored in the graphic memory equally divided into "n" parts to the buffer areas of the display memory from which the pieces of partial data have been outputted, and when remaining pieces of partial data of the same frame data as the partial data previously outputted from the display buffer are outputted in succession, the save processing means saves the remaining pieces of partial data from the graphic memory to the buffer areas of the display memory.

4. An image processing device according to claim 1, wherein:

the display memory is provided with "(n+1)", where "n" is an integer of "2" or more, buffer areas, and the pieces of partial data of the frame data equally divided into "n" parts, by the save processing means are stored in the "n" buffer areas; and the save processing means is arranged so as to save the frame data stored in the graphic memory to the display memory by equally dividing the frame data into "n" pieces of partial data when the partial data of "(n−1)" pieces are outputted from the display memory.

5. An image processing device according to claim 1, wherein:

the display memory is provided with "(n+2)", where "n" is an integer of "2" or more, buffer areas, and pieces of partial data of the frame data equally divided into "n" parts by the save processing means are stored in the "n" buffer areas;

when "m", where "m" is an integer represented by "1≦m≦(n−1)", pieces of partial data are outputted from the display memory, the save processing means saves the "m" pieces of partial data among next frame data equally divided into "n" parts from the graphic memory to the display memory, and when remaining pieces of partial data of the same frame data as the partial data previously outputted from the display buffer are outputted in succession, the save processing means saves the remaining pieces of partial data from the graphic memory to the buffer areas of the display memory; and the image transformation processing means carries out the predetermined transformation process on the pieces of partial data saved in the buffer areas and stores results of the transformation process in the buffer areas except the buffer areas in which the partial data has been saved and in which the pieces of partial data divided from the same frame data as the partial data have been saved.

6. An image processing device according to claim 1, wherein:

the display memory is provided with "(n+3)", where "n" is an integer of "2" or more, buffer areas, and pieces of partial data of the frame data equally divided into "n" parts by the save processing means are stored in the "n" buffer areas;

when "m", which is an integer represented by "1≦m≦(n−1)", pieces of partial data are outputted from the display memory, the save processing means saves the partial data from the graphic memory to the display memory, and when remaining pieces of partial data of the same frame data as the partial data previously outputted from the display buffer are outputted in succession, the save processing means saves the remaining pieces of partial data from the graphic memory to the buffer areas of the display memory; and the image transformation processing means carries out the predetermined transformation process on one or more pieces of partial data saved in the buffer areas and stores results of the transformation process in the buffer areas except the buffer areas in which the partial data used for the transformation process has been saved and in which the pieces of partial data divided from the same frame data as the partial data have been saved.

7. An image processing device according to claim 1, wherein:

the output interface is arranged so as to output "k" ("k" is an integer of "2" or more) video output signals at different refresh rates;

the display memory is provided with "(n+2k−1)", where "n" is an integer that satisfies "n>2k−1", buffer areas, and pieces of partial data of the frame data equally divided into "n" parts by the save processing means are stored in the "n" buffer areas; and when outputs of "(n−1)" pieces of partial data have ended at a fastest refresh rate, the save processing means saves partial data of frame data of a next frame from the graphic memory to the buffer areas except the buffer areas storing the partial data being outputted at another refresh rate and the partial data to be outputted next at respective refresh rates.

8. An image processing system, comprising:

image processing means for carrying out predetermined image processing per frame of a moving image, and for storing frame data representing an image corresponding to a result of the image processing to a predetermined graphic memory;

a display memory provided with a plurality of buffer areas, for storing the frame data to each of the buffer areas by dividing the frame data, and the plurality of buffer areas being of a number sufficient for storing the frame data of less than two frames;

save processing means for saving the frame data stored in the graphic memory to the display memory;

image transformation processing means for carrying out a predetermined transformation process on the pieces of partial data saved in the buffer areas of the display memory, and for storing results of the transformation process in the buffer areas in which the pieces of partial data have been stored; and an output interface for transforming the frame data saved in the display memory into video output signals and outputting the signals to the outside, wherein:

the save processing means is arranged so as to store the frame data stored in the graphic memory by equally dividing the frame data into a plurality of pieces of partial data in a number equal to or less than the number of buffer areas of the display memory and into a data size that can be stored in each of the buffer areas, to the buffer areas whose number corresponds to the number of the pieces of partial data; and the graphic memory and the display memory are provided in different units connected via a network.

9. An image processing method executed in a device having save processing means for saving frame data representing an image corresponding to a result of predetermined image processing carried out per frame of a moving image from a graphic memory in which the frame data is stored to a predetermined display memory having a plurality of buffer areas in a number sufficient for storing the frame data of less than two frames, and which causes a predetermined display unit to display the frame data saved in the display memory by transforming the frame data into a video output signal, comprising the steps of:

generating, by the save processing means, pieces of partial data by equally dividing the frame data stored in the graphic memory in a number equal to or less than the number of buffer areas of the display memory and into a data size that can be stored in each of the buffer areas;

saving the frame data from the graphic memory to the display memory per piece of partial data by saving the pieces of partial data to the buffer areas whose number corresponds to the number of pieces of partial data;

carrying out a predetermined transformation process on the pieces of partial data saved in the buffer areas of the display memory, and for storing results of the transformation process in the buffer areas in which the pieces of partial data have been stored; and transforming the frame data saved in the display memory into the video output signal per piece of partial data and outputting the video output signal for the display unit.

10. A non-transitory, computer readable storage medium containing a computer program for a computer that saves frame data representing an image corresponding to a result of predetermined image processing carried out per frame of a moving image from a graphic memory in which the frame data is stored to a predetermined display memory having a plurality of buffer areas in a number sufficient for storing the frame data of less than two frames, and which causes a predetermined display unit to display the frame data saved in the display memory by transforming the frame data into a video output signal;

the computer program causing the computer to execute:

a process of generating the partial data by equally dividing the frame data stored in the graphic memory in a number equal to or less than the number of buffer areas of the display memory and into a data size that can be stored in each of the buffer areas;

a process of saving the frame data from the graphic memory to the display memory per piece of partial data by saving the pieces of partial data to the buffer areas whose number corresponds to the number of pieces of partial data;

carrying out a predetermined transformation process on the pieces of partial data saved in the buffer areas of the display memory, and for storing results of the transformation process in the buffer areas in which the pieces of partial data have been stored; and a process of transforming the frame data saved in the display memory into the video output signal per piece of partial data and outputting the video output signal for the display unit.

11. A semiconductor device that can be mounted in a device for carrying out predetermined image processing per frame of a moving image and displaying an image corresponding to a result of the image processing on a predetermined display unit, comprising:

a graphic memory for storing frame data representing the image corresponding to the result of the image processing;

a display memory for storing the frame data, the display memory having a plurality of buffer areas in a number sufficient for storing the frame data of less than two frames;

means for generating partial data by equally dividing the frame data stored in the graphic memory in a number equal to or less than the number of buffer areas of the display memory and into a data size that can be stored in each of the buffer areas;

save processing means for saving partial data obtained by equally dividing the frame data stored in the graphic memory from the graphic memory to the display memory per piece of partial data by saving the pieces of partial data to the buffer areas whose number corresponds to the number of pieces of partial data;

means for carrying out a predetermined transformation process on the pieces of partial data saved in the buffer areas of the display memory, and for storing results of the transformation process in the buffer areas in which the pieces of partial data have been stored; and an output interface for outputting the partial data saved in the display memory to the display unit by transforming the partial data into a video output signal per piece of partial data, and outputting the video output signal for the display unit.

12. An image processing device, comprising:

image processing means for carrying out predetermined image processing per frame of a moving image, and storing frame data representing an image corresponding to a result of the image processing to a predetermined graphic memory;

save processing means for saving partial data obtained by equally dividing the frame data from the graphic memory to a predetermined display memory per piece of partial data, wherein:

the display memory has a plurality of buffer areas in a number sufficient for storing the frame data of less than two frames, the save processing means is arranged so as to store pieces of partial data, which are obtained by equally dividing the frame data stored in the graphic memory into a number equal to or less than the number of buffer areas of the display memory and into a data size that can be stored in each of the buffer areas, to the buffer areas whose number corresponds to the number of the pieces of partial data; and an output interface for outputting the partial data saved in the display memory to the outside by transforming the partial data into a video output signal per piece of partial data, wherein:

the output interface is arranged so as to output “k” (“k” is an integer of “2” or more) video output signals at different refresh rates;

the display memory is provided with “(n+2k−1)”, where “n” is an integer that satisfies “n>2k−1”, buffer areas, and pieces of partial data of the frame data equally divided into “n” parts by the save processing means are stored in the “n” buffer areas; and when outputs of “(n−1)” pieces of partial data have ended at a fastest refresh rate, the save processing means saves partial data of frame data of a next frame from the graphic memory to the buffer areas except the buffer areas storing the partial data being outputted at another refresh rate and the partial data to be outputted next at respective refresh rates.

* * * * *